US006606573B2

(12) United States Patent
Wheeler

(10) Patent No.: US 6,606,573 B2
(45) Date of Patent: Aug. 12, 2003

(54) SENSOR APPARATUS, METHODS AND COMPUTER PROGRAM PRODUCTS EMPLOYING VIBRATIONAL SHAPE CONTROL

(75) Inventor: Matthew Glen Wheeler, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/942,189

(22) Filed: Aug. 29, 2001

(65) Prior Publication Data

US 2003/0083830 A1 May 1, 2003

(51) Int. Cl.[7] ............................................... G01F 17/00
(52) U.S. Cl. ..................... 702/56; 702/45; 702/100; 73/1.16; 73/861.18; 73/861.354; 73/861.355; 73/861.357; 73/861.356
(58) Field of Search ..................... 702/45, 56, 100; 73/1.16, 861.18, 861.354, 861.355, 861.357, 861.356

(56) References Cited

U.S. PATENT DOCUMENTS

| | | | |
|---|---|---|---|
| 4,938,075 A | 7/1990 | Lew | |
| 5,050,439 A | 9/1991 | Thompson | |
| 5,323,658 A | 6/1994 | Yao et al. | |
| 5,363,706 A | 11/1994 | Lew | |
| 5,531,126 A | 7/1996 | Drahm | |
| 5,656,779 A | * 8/1997 | Bronowicki | 536/24.3 |
| 5,736,653 A | 4/1998 | Drahm et al. | |
| 5,804,741 A | 9/1998 | Freeman | |
| 5,827,979 A | 10/1998 | Schott et al. | |
| 6,233,526 B1 | * 5/2001 | Cunningham | 702/45 |
| 6,301,973 B1 | * 10/2001 | Smith | 73/861.27 |
| 6,360,175 B1 | * 3/2002 | Cunningham et al. | 702/39 |

FOREIGN PATENT DOCUMENTS

WO  WO 01/04583 A1  1/2001

\* cited by examiner

*Primary Examiner*—John Barlow
*Assistant Examiner*—Anthony Dougherty
(74) *Attorney, Agent, or Firm*—Duft Setter Ollila & Bornsen

(57) ABSTRACT

A parameter sensor including a conduit configured to contain a material is controlled. A first excitation applied to the conduit is determined. Motion of the conduit in response to the first excitation is determined. A second excitation to apply to the conduit is determined from the determined first excitation, the determined motion in response to the first excitation, a desired motion for the conduit, and a frequency response for the conduit. In particular, excitations may be iteratively determined and applied to the conduit, and motion signals representing motion of the excited conduit may be processed to generate process parameter estimates, such as mass flow rate estimates. The frequency response may be assumed to be time-invariant, or may be adaptively estimated. The invention may be embodied as methods, apparatus and computer program products.

56 Claims, 10 Drawing Sheets

SENSOR APPARATUS, METHODS AND COMPUTER PROGRAM PRODUCTS EMPLOYING VIBRATIONAL SHAPE CONTROL

FIELD OF THE INVENTION

The present invention relates to sensors and related methods and computer program products, and more particularly, to vibrating-conduit measurement apparatus, methods and computer program products.

BACKGROUND OF THE INVENTION

Vibrating conduit sensors, such as Coriolis mass flowmeters, typically operate by detecting motion of a vibrating conduit that contains a material. Properties associated with the material in the conduit, such as mass flow, density and the like, in the conduit may be determined by processing signals from motion transducers associated with the conduit, as the vibrational modes of the vibrating material-filled system generally are affected by the combined mass, stiffness and damping characteristics of the containing conduit and the material contained therein.

A typical Coriolis mass flowmeter includes one or more conduits that are connected inline in a pipeline or other transport system and convey material, e.g., fluids, slurries and the like, in the system. Each conduit may be viewed as having a set of natural vibrational modes including, for example, simple bending, torsional, radial and coupled modes. In a typical Coriolis mass flow measurement application, a conduit is excited at resonance in one of its natural vibrational modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time or phase differences between motion at the transducer locations. Exemplary Coriolis mass flowmeters are described in U.S. Pat. No. 4,109,524 to Smith, U.S. Pat. No. 4,491,025 to Smith et al., and U.S. Pat. No. Re. 31,450 to Smith.

The accuracy of Coriolis mass flowmeters may be compromised by nonlinearities and asymmetries in the conduit structure, motion arising from extraneous forces, such as forces generated by pumps and compressors that are attached to the flowmeter, and motion arising from pressure forces exerted by the material flowing through the flowmeter conduit. For example, variations in forces applied to an unbalanced Coriolis mass flowmeter arising from variations in mounting conditions may significantly affect its performance. The effects of these forces may be reduced by using flowmeter designs that are balanced to reduce effects attributable to external vibration, and by using signal processing techniques to compensate for unwanted components of motion. However, variations in environmental conditions and mounting conditions may still introduce bias or other inaccuracies into measurements made according to such techniques.

SUMMARY OF THE INVENTION

According to embodiments of the present invention, a parameter sensor including a conduit configured to contain a material is controlled. A first excitation applied to the conduit is determined. Motion of the conduit in response to the first excitation is determined. A second excitation to apply to the conduit is determined from the determined first excitation, the determined motion in response to the first excitation, and a desired motion for the conduit. The second excitation is then applied to the conduit.

In particular, according to some embodiments of the present invention, the desired motion includes a desired periodic motion at the predetermined frequency. Determining the first excitation includes determining a first periodic excitation at the predetermined frequency. Determining motion of the conduit in response to the first excitation includes determining periodic motion at the predetermined frequency in response to the first periodic excitation. Determining a second excitation includes determining a second periodic excitation at the predetermined frequency to apply to the conduit from the determined first periodic excitation, the determined periodic motion at the predetermined frequency in response to the first periodic excitation, and the desired periodic motion. Applying the second excitation includes applying the second periodic excitation to the conduit.

According to some embodiments of the present invention, a second excitation to apply to the conduit is determined from a determined previous first excitation, a determined motion in response to the first excitation, a desired motion for the conduit, and a frequency response for the conduit. In some embodiments of the present invention, the frequency response is assumed to be time-invariant. In other embodiments of the present invention, the frequency response is adaptively determined. For example, the frequency response may be determined according to a recursive least squares estimation procedure, such as a weighted recursive least squares estimation procedure.

For example, in some embodiments, adaptively determining the frequency response includes generating a first estimated frequency response and then generating a second estimated frequency response from the first estimated frequency response, the determined first excitation, and the determined motion of the conduit in response to the first excitation. Determining a second excitation includes determining the second excitation from the determined first excitation, the desired motion, the determined motion in response to the first excitation, and at least one of the first estimated frequency response and the second estimated frequency response. In particular, the first estimated frequency response may include a first estimated inverse frequency response, the second estimated frequency response may include a second inverse estimated frequency response, and the second excitation may be determined from the determined first excitation, the desired motion, the determined motion in response to the first excitation, and at least one of the first estimated inverse frequency response and the second estimated inverse frequency response.

According to some embodiments, a plurality of drive signals is generated based on the determined first excitation, the determined motion in response to the first excitation, a desired motion for the conduit, and the frequency response. The plurality of drive signals is applied to a plurality of actuators operatively associated with the conduit to generate the second excitation. The desired motion may include a desired periodic motion at the predetermined frequency and the desired motion may be represented by a phasor representation of the desired periodic motion at the predetermined frequency. Determining a first excitation may include generating a phasor representation of a first periodic excitation at the predetermined frequency. Determining motion of the conduit in response to the first excitation may include processing motion signals representing the motion of the conduit in response to the first excitation to generate a phasor representation of motion of the conduit at the predetermined frequency in response to the first excitation. Generating a plurality of drive signals may include generating a phasor representation of a second periodic excitation at the predetermined frequency from the phasor representation of the first periodic excitation, the phasor representation of the desired motion, the phasor representation of motion of the conduit at the predetermined frequency in response to the first excitation, and the frequency response, and generating the plurality of drive signals from the phasor representation of the second periodic excitation.

According to other embodiments of the present invention, a process parameter associated with a material contained in a conduit is determined. The conduit is excited by iteratively determining and applying new excitations to the conduit and determining motion in response to the applied new excitations such that a new excitation is determined based on a previously determined excitation, a determined motion in response to the previously determined excitation, a desired motion for the conduit, and a frequency response for the conduit. Motion signals representative of motion of the excited conduit are processed to generate an estimate of a process parameter, e.g., a mass flow parameter such as mass flow rate, associated with a material contained in the conduit.

The conduit may be excited such that motion at a location of the conduit is constrained to approximate a predetermined motion. For example, the conduit may be excited such that motion of the conduit is constrained to approximate a predetermined boundary condition for a real normal mode of the conduit. The motion signals may be processed according to a procedure that assumes the predetermined boundary condition to generate the parameter estimate.

In still other embodiments of the present invention, an apparatus is provided for controlling a parameter sensor including a conduit configured to contain a material, a plurality of actuators operative to move the conduit responsive to drive signals, and a plurality of motion transducers operative to generate motion signals representative of motion of the conduit. The apparatus includes a shape control circuit configured to be coupled to the motion transducers and to the actuators. The shape control circuit is operative to apply a first plurality of drive signals to the plurality of actuators to apply a first excitation to the conduit, to process motion signals received from the plurality of motion transducers to determine motion of the conduit in response to the first excitation, and to apply a second plurality of drive signals to the plurality of actuators based on the first excitation, the determined motion in response to the first excitation, and a desired motion for the conduit to thereby apply a second excitation to the conduit. The shape control circuit may further include a frequency response determiner circuit operative to adaptively determine a frequency response of the conduit, and may generate the second plurality of drive signals based on the first excitation, the determined motion in response to the first excitation, the desired motion for the conduit, and the determined frequency response.

In other embodiments of the present invention, a process parameter sensor includes a conduit configured to contain a material, a plurality of actuators operatively associated with the conduit, and a plurality of motion transducers operatively associated with the conduit. The sensor further includes a shape control circuit configured to receive motion signals-from the plurality of motion transducers and to apply drive signals to the plurality of actuators. The shape control circuit is operative to excite the conduit by iteratively determining and applying new excitations to the conduit and determining motion in response to the applied new excitations such that a new excitation is determined based on a previously determined excitation, a determined motion in response to the previously determined excitation, and a desired motion for the conduit. A process parameter estimator circuit is configured to receive motion signals from the plurality of motion transducers and operative to process the received motion signals to generate an estimate of a process parameter, e.g., mass flow rate, associated with a material contained in the conduit.

According to other embodiments of the present invention, a computer program product is provided for controlling a parameter sensor including a conduit configured to contain a material, a plurality of actuators operatively associated with the conduit, and a plurality of motion transducers operatively associated with the conduit. The computer program product includes computer-readable program code embodied in a computer readable storage medium. The computer-readable program code includes program code, responsive to the motion transducers, for determining motion of the conduit in response to a known first excitation applied to the conduit. The computer-readable program code further includes program code, responsive to the program code for determining motion, for determining a second excitation to apply to the conduit from the known first excitation, the determined motion in response to the first excitation, and a desired motion for the conduit. The computer-readable program code further includes program code for causing the plurality of actuators to apply the second excitation to the conduit.

DETAILED DESCRIPTION OF EMBODIMENTS

Figure 1:
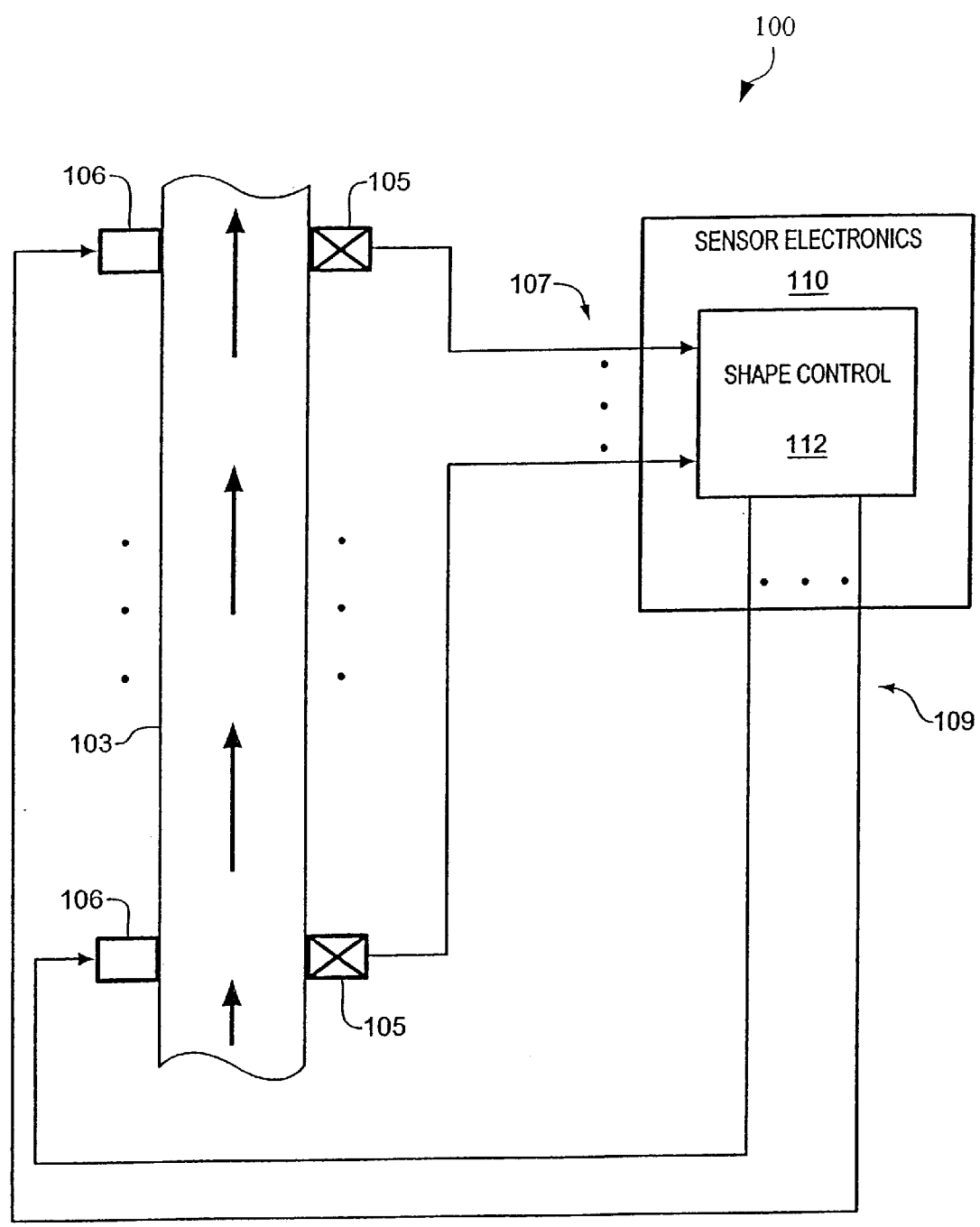
FIG. 1 is a schematic diagram illustrating a parameter sensor according to embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. As will be appreciated by one of skill in the art, the present invention may be embodied as systems (apparatus), methods, or computer program products.

Embodiments of the present invention described herein relate to Coriolis mass flowmeters that utilize a single, substantially straight conduit that does not require, for example, a mechanically tuned balance beam. The present invention may be particularly advantageous in such applications. However, those skilled in the art will appreciate that the present invention can be used with other types of flowmeter structures, including conventional curved tube structures and straight tube structures including mechanical balance beams.

As will be appreciated by one of skill in the art, the present invention may be embodied as an apparatus and/or method and/or computer program product. The present invention may be implemented in hardware or in a combination of hardware and software aspects. Furthermore, the present invention may also take the form of a computer program product including a computer-usable storage medium having computer-usable program code embodied in the medium. Any suitable computer readable medium may be utilized, including semiconductor memory devices (e.g., RAMs, ROMs, EEPROMs, and the like), hard disks, CD-ROMs, optical storage devices, and magnetic storage devices.

Computer program code for carrying out operations of the present invention may be written in an object oriented programming language, such as Java® or C++, and/or in a procedural programming languages, such as "C." The program code may execute on a single computer or data processing device, such as a microcontroller, microprocessor, or digital signal processor (DSP), or may be executed on multiple devices, for example, on multiple data processing devices that communicate via serial or parallel data busses within an electronic circuit board, chassis or assembly, or which form part of a data communications network such as a local area network (LAN), wide area network (WAN), or internet.

The present invention is described below with reference to flowchart illustrations and/or block diagrams of methods, apparatus (systems) and computer program products according to embodiments of the invention. It will be understood that blocks of the flowchart illustrations and/or block diagrams, and combinations of blocks in the flowchart illustrations and/or block diagrams, can be implemented by computer program code (instructions). The computer program code may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks. These computer program products also may be embodied in a computer-readable storage medium (e.g., magnetic disk or semiconductor memory, code magnetic memory or the like) that can direct a computer or other programmable data processing apparatus to function in a particular manner, such that the computer program stored in the computer-readable memory produce an article of manufacture including instruction means which implement the function specified in the flowchart and/or block diagram block or blocks. The computer program code may also be loaded onto a computer or other programmable data processing apparatus to cause a series of operational steps to be performed on the computer or other programmable apparatus to produce a computer implemented process such that the code that executes on the computer or other programmable apparatus provides steps for implementing the functions specified in the flowchart and/or block diagram block or blocks.

Overview

The following discussion provides an underlying theoretical description that supports apparatus, methods and computer program products according to embodiments of the present invention. It will be appreciated that the scope of the present invention is not limited to this theoretical explanation. For example, the discussion that follows describes computational operations. Although these operations are presented with a particular sequence and organization to facilitate understanding of the present invention, it will be appreciated that the computational operations may be reordered, combined in a different fashion or otherwise modified within the scope of the present invention. Consequently, it will be further understood that, in general, the present invention includes not only the specific computational operations described herein, but also equivalent operations.

A typical Coriolis mass flowmeter includes a conduit having a straight, curved or other configuration, adapted to receive a material from, for example, a pipeline. The conduit is typically excited (vibrated) using one or more actuators, e.g., coil-type drivers. Motion transducers, e.g., coil-type velocity or displacement sensors, are typically attached to the conduit and generate signals that are indicative of motion of the conduit as the material flows therethrough. These motion signals are typically processed to generate a measurement of relative motion of space-apart locations of the conduit, e.g., a phase or time difference ("delta-t") measurement, which, in turn, may be used to generate a mass flow estimate.

If a flow sensor "system" is driven by sinusoids and it reaches steady state before the next change in excitation, then the behavior of the system can be described by its frequency response. As straight tube Coriolis mass flowmeters are commonly driven at a drive frequency that typically is at or near the resonant frequency of the first bending mode of the straight tube conduit, further simplification can be achieved by limiting consideration to frequency response at only the drive frequency. At the drive frequency, the vibrated system may be represented in the frequency domain as a matrix equation:

$$v_{k+1} = Hf_k, \qquad (1)$$

wherein $f_k$ is vector of excitation phasors representative of periodic excitations (e.g., forces) applied to locations of the conduit, $v_{k+1}$ is a vector of response phasors representative of conduit motion (e.g., velocity) at locations of the conduit in response to the excitations, and H is a frequency response matrix. For example, sinusoidal drive signals may be synthesized from the excitation phasor vector $f_k$ and applied to actuators that apply forces to the sensor conduit, and that, after the system settles, motion signals generated in response to the applied force may be processed to generate the response phasor vector $v_{k+1}$. The frequency response matrix H may be viewed as a "slice" of the system's frequency response at the drive frequency.

An excitation phasor vector $f_k$ that causes a response phasor vector $v_{k+1}$ to approach a target response phasor vector $v_T$ may be determined as a solution to the relation:

$$Hf_k = v_T. \qquad (2)$$

The solution $f_*$ to equation (2) can be calculated using:

$$f_* = H^{-1} v_T. \tag{3}$$

If the frequency response matrix H is square and full rank, a solution to equation (3) should be feasible.

Coriolis mass flowmeters are generally significantly time varying, i.e., have a system frequency response that changes with fluid density, fluid or ambient temperature, mounting, and other factors. However, one could assume that such variations in the frequency response H are insignificant such that the frequency response could be assumed to be time-invariant, measure a frequency response $H_o$ at some given time, and then use this measured frequency response $H_o$ to calculate excitation vectors:

$$H_o f_k = v_T$$

$$f_k = H_o^{-1} v_T \tag{4}$$

Calculating the excitation phasor vector f using $H_o$ could result in deviations of the response vector v from the set point $v_T$. However, even small differences between the actual frequency response and the assumed frequency response $H_o$ may cause significant deviations in the estimated response.

An alternative to assuming a time-invariant frequency response would be to continuously update the frequency response estimate $H_o$ to maintain a better match between the approximation $H_o$ and the actual frequency response. For example, equation (4) may be solved iteratively. To develop this iterative solution, first form the norm L of an error vector e:

$$e = H_o f - v_T \tag{5}$$

$$L = \|e\|_2^2 = e^H e \tag{6}$$

The norm L is the vector product of the conjugate transpose of the error vector e and itself. It is a real, nonnegative, scalar valued function of the complex excitation phasor vector f. It measures the closeness of f to the solution of equation (4). Solving the optimization problem:

$$\min_f L(f). \tag{7}$$

may be viewed as equivalent to solving equation (4), if a solution of equation (4) exists.

This quadratic optimization problem can be solved with a gradient descent iteration technique. An initial estimate (guess) $f_k$ of an excitation phasor vector can be used to generate a new estimate $f_{k+1}$ of the excitation phasor vector by:

$$f_{k+1} = f_k - \tfrac{1}{2}\mu[\nabla_f(L)]. \tag{8}$$

The sequence of estimates $\{f_k, f_{k+1}, f_{k+2}, \ldots\}$ steps along the gradient $\nabla_f$ of L with respect to f. The gradient $\nabla_f$ is the direction of steepest increase of f on the L surface. For a complex vector argument, the gradient $\nabla_f$ may be defined as:

$$\nabla_F(L) = 2 \frac{\partial L}{\partial f^H}. \tag{9}$$

Expanding the objective function L:

$$L = [H_o f - v_T]^H [H_o f - v_T]$$

$$L = f^H H_o^H H_o f - f^H H_o^H v_T - v_T^H H_o f + v_T^H v_T \tag{10}$$

and evaluating the gradient $\nabla_f$:

$$\nabla_f(L) = 2 \frac{\partial L}{\partial f^H} = 2[H_o^H H_o f - H_o^H v_T]. \tag{11}$$

The gradient $\nabla_f$ may be evaluated at the current excitation vector guess $f_k$. Replacing f with $f_k$ in equation (11) and substituting into equation (8) yields:

$$f_{k+1} = f_k - \mu[H_o^H H_o f_k - H_o^H v_T]. \tag{12}$$

If the sequence $\{f_k, f_{k+1}, f_{k+2}, \ldots\}$ converges, then, as $k \to \infty$:

$$[I - I + \mu H_o^H H_o] f_\infty = \mu H_o^H v_T$$

$$H_o^H H_o f_\infty = H_o^H v_T$$

$$H_o f_\infty = v_T \tag{13}$$

The limit value of the sequence $\{f_k, f_{k+1}, f_{k+2}, \ldots\}$ as $k \to \infty$ can be viewed as a solution of equation (4). Equation (12) may converge or diverge depending on the values of $\mu$ and $H_o$.

There is a simple test for stability of equation (12). Rearranging equation (12) to standard form:

$$f_{k+1} = [I - \mu H_o^H H_o] f_k + \mu H_o^H v_T \tag{14}$$

If the eigenvalues of the matrix:

$$[I - \mu H_o^H H_o] \tag{15}$$

are all inside the unit circle on the complex plane, then the iteration generally is stable and the sequence $\{f_k, f_{k+1}, f_{k+2}, \ldots\}$ should converge, producing a solution to equation (4) in the limit.

If the iteration is stable but converges very slowly, then it may be of limited value. The iteration step size $\mu$ is a free parameter that may be set by the user, the choice of which generally affects the rate of convergence of the iteration. If $\mu$ is selected for an optimal rate of convergence, then the rate of convergence is bounded by:

$$\frac{L(f_{k+1})}{L(f_k)} \geq \left(\frac{r-1}{r+1}\right)^2 \tag{16}$$

where r is the condition number of the matrix $[H_o^H H_o]$. The condition number is the ratio of the maximum to the minimum eigenvalues of the matrix.:

$$r = \frac{\max(eig([H_o^H H_o]))}{\min(eig([H_o^H H_o]))} \tag{17}$$

So if the eigenvalue spread of $[H_o^H H_o]$ is large, then convergence will generally be slow. If the ratio is close to one, then convergence will generally be faster. For example if r=1.1, then, by equation (16), the objective function L will be decreased by a factor of no less than 1/441 at each step of the iteration.

For some systems, the condition number of $[H_o^H H_o]$ may be large, resulting in slow convergence of equation (14). To speed convergence, the original error vector in equation (5) can be multiplied by a weighting matrix P:

$$e=P[H_o f - v_T] \quad (18)$$

Minimizing the norm of the weighted error can still produce the correct solution to equation (4). However, the choice of the weighting matrix P can reduce stability and the rate of convergence of the iteration.

Using the weighted error vector, the iteration of equation (14) becomes:

$$f_{k+1}=[I-\mu H_o^H P^H P H_o] f_k + \mu H_o^H P^H P v_T. \quad (19)$$

Now, the rate of convergence may be determined by the eigenvalue spread of the matrix:

$$[H_o^H P^H P H_o]. \quad (20)$$

A desirable choice for the weighting matrix P is:

$$P=H_o^{-1}. \quad (21)$$

Substituting equation (21) into equation (19):

$$f_{k+1}=[I-\mu I]f_k + \mu H_o^{-1} v_T. \quad (22)$$

This choice of P may be desirable because it can lead to rapid convergence along all dimensions. In fact, if $\mu=1$, convergence may occur in a single step.

Even with improved convergence properties, the excitation identification problem may still be sensitive to modeling errors. In particular, if the estimated frequency response is inaccurate, then applying the excitation $f_\infty$ to the real system may result in a response that does not match the set point $v_\infty \neq v_T$.

Equation (12) can be rearranged:

$$f_{k+1}=f_k - \mu H_o^H [H_o f_k - v_T]. \quad (23)$$

If the excitation phasor vector $f_k$ is applied to the real system at step k, then:

$$H f_k = v_{k+1}. \quad (24)$$

$v_{k+1}$ can be measured at step k+1. Assuming a small modeling error $H_0 \cong H$, and substituting equation (24) into equation (23), the iteration for the excitation pattern becomes:

$$f_{k+1}=f_k - \mu H_o^H [v_{k+1} - v_T] \quad (25)$$

where the term in the brackets is the deviation of the measured system response from the desired response at step k+1. If the iterative process represented by equation (25) converges, then the excitation pattern will adapt such that the measured response $v_{k+1}$, approaches the desired response $v_T$, even if the frequency response model $H_o$ is not perfectly accurate.

Weighting the error vector by the matrix P, equation (23) becomes:

$$f_{k+1}=f_k - \mu H_o^H P^H P[H_o f_k - v_T]. \quad (26)$$

and equation (25) becomes:

$$f_{k+1}=f_k - \mu H_o^H P^H P[v_{k+1} - v_T]. \quad (27)$$

Using equation (21) to set $P=H_o^{-1}$, then:

$$\boxed{f_{k+1} = f_k - \mu H_o^{-1}[v_{k+1} - v_T]} \quad (28)$$

Using equation (24) and rearranging to examine convergence:

$$f_{k+1}=[I-\mu H_o^{-1} H]f_k - \mu H_o^{-1} v_T. \quad (29)$$

This iteration should be stable if the eigenvalues of:

$$[I-\mu H_o^{-1} H] \quad (30)$$

are contained inside the unit circle. The rate of convergence for the iteration can be determined by the eigenvalue spread of:

$$[H_o^{-1} H]. \quad (31)$$

The smaller the modeling errors, the closer the approximation:

$$H_0^{-1} H \cong I. \quad (32)$$

Generally, the better this approximation, the tighter the eigenvalue spread, and the faster the convergence. If modeling errors are large enough to cause the iteration to diverge, then a step size $\mu<1.0$ may be selected to restore convergence at rate lower than that predicted by equation (16).

Convergence of the above-described iterative process may be very fast (e.g., just a few steps) if the frequency response model of the system is accurate. According to aspects of the present invention, a frequency response model of a sensor conduit system is iteratively updated to reduce modeling error and maintain desirable convergence of an estimated response vector to a desired response, in the presence of system changes, such as changes in fluid properties or mounting structure.

In the force adaptation equation (28), a model of the inverse of the frequency response is used to calculate a new force estimate. According to some embodiments of the present invention, updating of a frequency response model involves iterative determination of an inverse frequency response Q:

$$Q=H_o^{-1} \quad (33)$$

according to a least squares estimation procedure. The inverse frequency response Q can be determined by solving the matrix equation:

$$Q[v_{k-N+1}, \ldots, v_{k-1}, v_k]=[f_{k-N}, \ldots, f_{k-2}, f_{k-1}] \quad (34)$$

where Q is an unknown matrix and $[f_{k-N}, \ldots, f_{k-2}, f_{k-1}, f_k]$ and $[v_{-N+1}, \ldots, v_{k-1}, v_k, v_{k+1}]$ are measured excitation and response phasor vectors respectively, stacked column wise over N steps. Define:

$$F=[f_{k-N}, \ldots, f_{k-2}, f_{k-1}] \quad (35)$$

and $$V=[v_{k-N+1}, \ldots, v_{k-1}, v_k]. \quad (36)$$

Rewriting equation (34):

$$QV=F. \quad (37)$$

The least squares solution to equation (37) is:

$$Q=FV^H[VV^H]^{-1}. \tag{38}$$

This can be shown by considering Q one row at a time. Form the error row vector:

$$e_i=[q_iV-f_i]. \tag{39}$$

The squared error is smallest when the gradient $\nabla_{q_i}$ of $e_ie_i^H$ with respect to $q_i$ is zero:

$$\nabla_{q_i}(e_ie_i^H)=q_iVV^H-f_iV^H=0 \tag{40}$$

or:

$$q_i=f_iV^H[VV^H]^{-1} \tag{41}$$

Stacking rows over index i in equation (41) gives equation (38). The matrix $VV^H$ must be full rank for the solution to exist. This is a constraint on the minimum number of steps N required before sufficient data has been collected to calculate the system inverse model.

Equation (38) may be a cumbersome way to calculate Q. The excitation and response data matrixes F and V grow linearly with time, and the matrix inverse generally is not a desirable operation to be performed in real time. After initial estimation of the inverse frequency response Q using initial excitation and response data, one would like to be able to update the inverse frequency response Q using new excitation and response vectors without reprocessing all previously collected data. The inverse frequency response $Q_k$ at step k is:

$$Q_k=FV^H[VV^H]^{-1}. \tag{42}$$

To generate a new estimate of the inverse frequency response at step k+1, excitation and response vectors $f_k$, $v_{k+1}$ may be appended to F and V, respectively. The inverse frequency response $Q_{k+1}$ at step k+1 is then:

$$Q_{k+1}=[F, f_k][V, v_{k+1}]^H[[V, v_{k+1}][V, v_{k+1}]^H]^{-1} \tag{43}$$

Equation (43) can be manipulated such that the "new" inverse frequency response estimate $Q_{k+1}$ can be calculated as a modification to the "old" inverse frequency response estimate $Q_k$. This can eliminate the need to save "old" excitation and response data, i.e., data for steps prior to step k+1.

To simplify notation define:

$$G_k=VV^H. \tag{44}$$

Appending the new data $v_{k+1}$ to the vector V:

$$G_{k+1}=[V, v_{k+1}][V, v_{k+1}]^H. \tag{45}$$

Combining equations (44) and (45):

$$G_{k+1}=G_k+v_{k+1}v_{k+1}^H. \tag{46}$$

Substituting equation (46) into equation (43):

$$Q_{k+1}[F, f_k][V, v_{k+1}]^H[G_{k+1}]^{-1}. \tag{47}$$

Expanding equation (47):

$$Q_{k+1}=[FV^H+f_kv_{k+1}^H][G_{k+1}]^{-1}. \tag{48}$$

Equation (48) involves the initial data matrices F and V. To express the first term, $FV^H$, as a function of terms at step k and step k+1 only, write:

$$FV^H=[FV^HG_k^{-1}]G_k. \tag{49}$$

Then, using equations (44) and (46):

$$FV^H=Q_kG_k. \tag{50}$$

Isolating $G_k$ in equation (45) and substituting into equation (50):

$$FV^H=Q_k[G_{k+1}-v_{k+1}v_{k+1}^H]. \tag{51}$$

Expanding equation (51):

$$FV^H=Q_kG_{k+1}-Q_kv_{k+1}v_{k+1}^H. \tag{52}$$

Substituting equation (52) into equation (48):

$$Q_{k+1}=[Q_kG_{k+1}-Q_kv_{k+1}v_{k+1}^H+f_kv_{k+1}^H][G_{k+1}]^{-1} \tag{53}$$

Equation (53) can be simplified to:

$$Q_{k+1}=Q_k+[f_k-Q_kv_{k+1}]v_{k+1}^HG_{k+1}^{-1}. \tag{54}$$

Equation (54) describes a recursive process for generating an estimate $Q_{k+1}$ of an inverse frequency response at a step k+1 from an estimate $Q_k$ generated in a preceding step k and from excitation and response data $f_k$, $v_k$ from step k.

This recursion could be used directly to improve the system inverse model, but it is possible to avoid inverting the matrix $G_{k+1}$. Inverting both sides of equation (46):

$$G_{k+1}^{-1}=[G_k+v_{k+1}v_{k+1}^H]^{-1} \tag{55}$$

Applying the matrix inversion lemma:

$$G_{k+1}^{-1}=G_k^{-1}+G_k^{-1}v_{k+1}[I+v_{k+1}^HG_k^{-1}v_{k+1}]^{-1}v_{k+1}^HG_k^{-1} \tag{56}$$

$I+v_{k+1}G_k^{-1}v_{k+1}^H$ is actually a scalar, so the matrix inverse may be reduced to a scalar division, such that equation (56) can be written as:

$$G_{k+1}^{-1} = G_k^{-1} + \left[\frac{G_k^{-1}v_{k+1}v_{k+1}^HG_k^{-1}}{1+v_{k+1}^HG_k^{-1}v_{k+1}}\right]. \tag{57}$$

Define:

$$P_k=G_k^{-1}. \tag{58}$$

Rewriting equation (57):

$$P_{k+1} = P_k + \left[\frac{P_kv_{k+1}v_{k+1}^HP_k}{1+v_{k+1}^HP_kv_{k+1}}\right]. \tag{59}$$

Rewriting equation (54):

$$Q_{k+1}=Q_k+[f_k-Q_kv_{k+1}]v_{k+1}^HP_{k+1} \tag{60}$$

From equation (60), it can be seen that an updated estimate $Q_{k+1}$ of the inverse frequency response for a step k+1 can be generated from a previous estimate $Q_k$ for a step k, an excitation $f_k$ for the step k and a response $v_{k+1}$ to the excitation $f_k$, and a factor $P_k$ for the step k.

Accordingly to other embodiments of the invention, a weighted recursive least squares estimation process may be used to adaptively estimate frequency response. A forgetting factor $\epsilon(0,1]$ can be introduced to weight old data less than present data in the update of the system inverse model. Following a procedure similar to that described above:

$$Q_k = FV^H[VV^H]^{-1}; \tag{61}$$

$$Q_{k+1} = [F, f_k]\begin{bmatrix} I & 0 \\ 0 & 1 \end{bmatrix}[V, v_{k+1}]^H \left[[V, v_{k+1}]\begin{bmatrix} I & 0 \\ 0 & 1 \end{bmatrix}[V, v_{k+1}]^H\right]^{-1}; \tag{62}$$

$$G_k = VV^H; \tag{63}$$

$$G_{k+1} = [V, v_{k+1}]\begin{bmatrix} I & 0 \\ 0 & 1 \end{bmatrix}[V, v_{k+1}]^H; \tag{64}$$

$$G_{k+1} = G_k + v_{k+1}v_{k+1}^H; \tag{65}$$

$$Q_{k+1} = [F, f_k]\begin{bmatrix} I & 0 \\ 0 & 1 \end{bmatrix}[V, v_{k+1}]^H [G_{k+1}]^{-1}; \tag{66}$$

$$Q_{k+1} = [FV^H + f_k v_{k+1}^H][G_{k+1}]^{-1}; \tag{67}$$

$$FV^H = [FV^H G_k^{-1}]G_k; \tag{68}$$

$$FV^H = Q_k G_k; \tag{69}$$

$$FV^H = Q_k[G_{k+1} - v_{k+1}v_{k+1}^H] /; \tag{70}$$

$$Q_{k+1} = [Q_k G_{k+1} - Q_k v_{k+1}v_{k+1}^H + f_k v_{k+1}^H][G_{k+1}]^{-1}; \tag{71}$$

$$G_{k+1}^{-1} = [G_k + v_{k+1}v_{k+1}^H]^{-1}; \tag{72}$$

$$G_{k+1}^{-1} = [G_k]^{-1} - [G_k]^{-1}v_{k+1}[I + v_{k+1}^H[G_k]^{-1}v_{k+1}]^{-1}v_{k+1}^H[G_k]^{-1}; \tag{73}$$

$$P_k = G_k^{-1}; \tag{74}$$

$$P_{k+1} = [P_k / ] - [P_k / ]v_{k+1}[I + v_{k+1}^H[P_k / ]v_{k+1}]^{-1}v_{k+1}^H[P_k / ]; \tag{75}$$

$$P_{k+1} = \frac{1}{\lambda}\left[P_k - \frac{P_k v_{k+1}v_{k+1}^H P_k}{+v_{k+1}^H P_k v_{k+1}}\right]; \tag{76}$$

and $$Q_{k+1} = Q_k + [f_k - Q_k v_{k+1}]v_{k+1}^H P_{k+1}. \tag{77}$$

A typical value for the forgetting factor would be λ=0.95. The complete weighted recursive least squares estimation process may be described as:

$$\begin{cases} v_{k+1} = Hf_k \\ P_{k+1} = \frac{1}{\lambda}\left[P_k - \frac{P_k v_{k+1}v_{k+1}^H P_k}{+v_{k+1}^H P_k v_{k+1}}\right] \\ Q_{k+1} = Q_k + [f_k - Q_k v_{k+1}]v_{k+1}^H P_{k+1} \\ f_{k+1} = f_k - Q_k[v_{k+1} - v_T] \end{cases} \tag{78}$$

Although equation (78) illustrates use of $Q_k$ for calculation of the updated excitation phasor vector $f_{k+1}$, $Q_k$, $Q_{k+1}$, or some derivative or combination thereof could be used in the equation for the updated excitation phasor vector $f_{k+1}$. Simulations appear to indicate that convergence may be more rapid when $Q_{k+1}$ is used, but more stable when $Q_k$ is used.

Exemplary Sensor Apparatus and Operations

FIG. 1 illustrates a parameter sensor 100 according to embodiments of the present invention. The sensor 100 includes a conduit 103 configured to contain a material, e.g., a fluid passing therethrough. A plurality of actuators 106, such as coil-type drivers typically used with Coriolis type flow sensors, is operatively associated with the conduit 103. In particular, the actuators 106 are operative to apply excitations to the conduit 103 responsive to drive signals 109 applied to the actuators 106. A plurality of motion transducers 105 is also operatively associated with the conduit, generating motion signals 107 that represent motion of the conduit 103 in response to excitations imparted by the actuators 106, excitations associated with the material flow through the conduit 103, as well as other excitations that may be imparted to the conduit 103 from external sources, such as mountings, pipeline connections, and the like.

The sensor 100 further includes sensor electronics 110 that is operative to receive the motion signals 107 and to generate the drive signals 109. In particular, the sensor electronics 110 includes a shape control circuit 112 that is operative to generate the drive signals 109 from the motion signals 107 in a manner as described above, for example, with reference to equations (28) or (78). For clarity of illustration, other possible components of the parameter sensor electronics 110, such as circuitry for generating parameter estimates from the motion signals 107, are not shown.

It will be appreciated that the sensor electronics 110 may be implemented in a number of different ways. For example, the sensor electronics 110 may include electronic circuitry that is packaged in an integrated fashion with the other portions of the sensor 100. Alternatively, all or a portion of the sensor electronics 110 may be separately packaged and/or integrated with other electronic circuitry, such as process control circuitry. It will be understood that, in general, the sensor electronics may be implemented using special purpose hardware, software or firmware executing on special or general purpose computing hardware, or combinations thereof.

Figure 2:
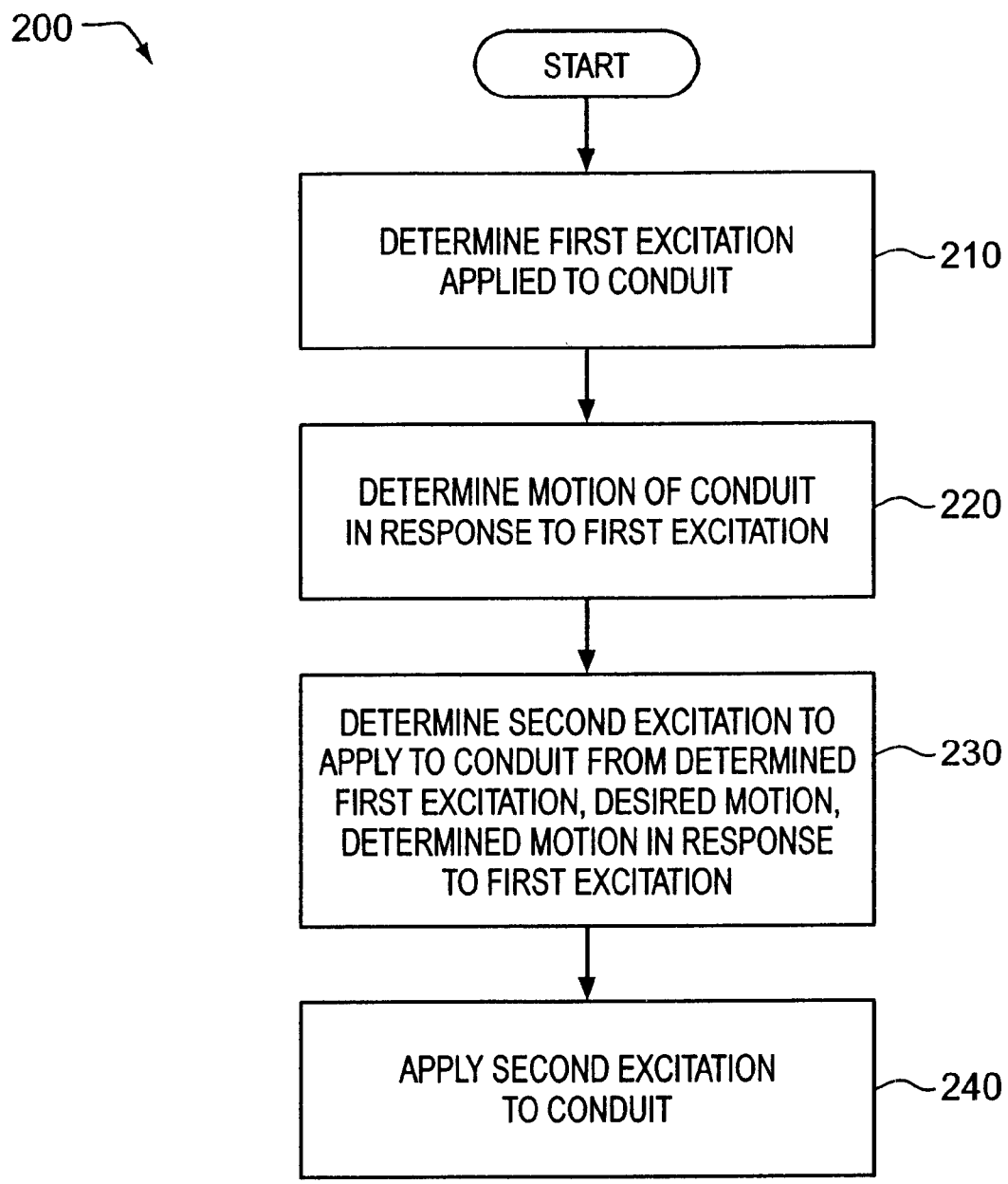
FIGS. 2, 3, and 4 are flowchart illustrations of exemplary operations for exciting a parameter sensor conduit according to embodiments of the present invention.
Figure 3:
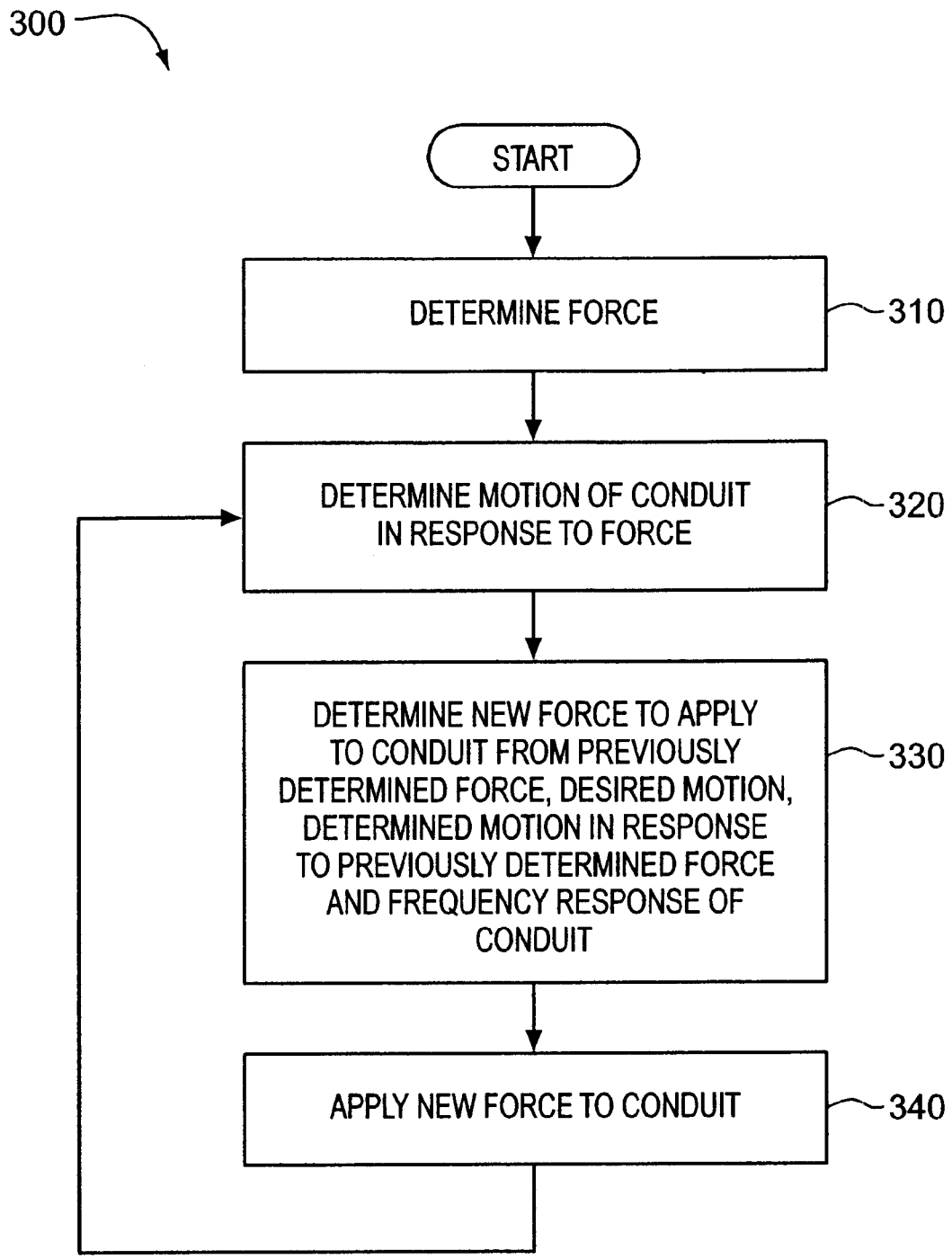
Figure 4:
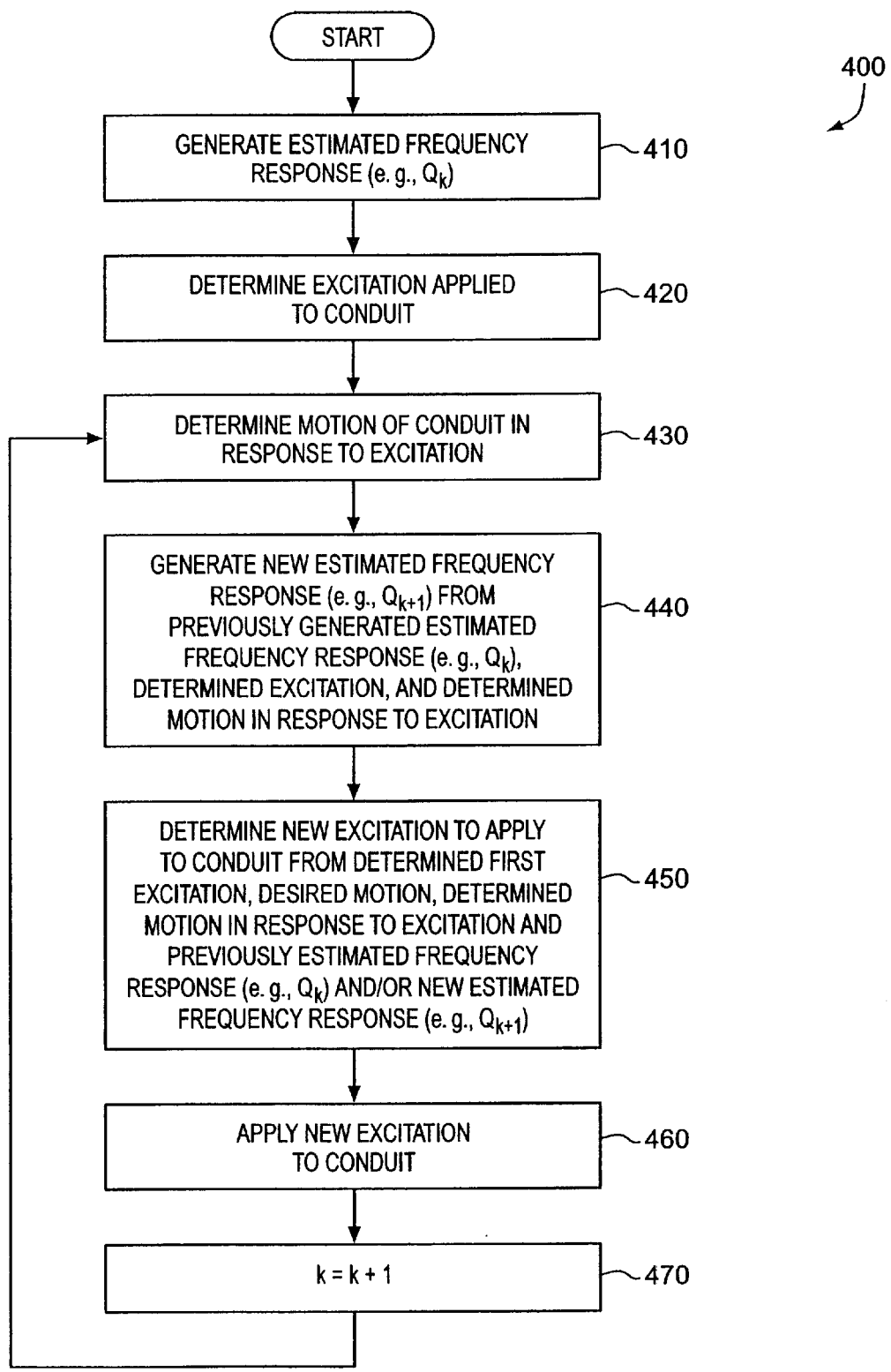

FIGS. 2–4 illustrate operations for controlling a parameter sensor, such as the parameter sensor 100 of FIG. 1, according to embodiments of the present invention. It will be appreciated that the operations of FIGS. 2–4 may be implemented in electronic circuitry, such as in the sensor electronics 110 of FIG. 1. For example, the operations of FIGS. 2–4 may be implemented using computer program code executing on a microprocessor or other computing device.

Referring to FIG. 2, a first excitation applied to a sensor conduit, such as the sensor conduit 103 of FIG. 1, is determined (Block 210), for example, in the form of a phasor or other representation of force. Motion of the conduit in response to the first excitation is determined (Block 220), e.g., by processing motion signals, such as the motion signals 107 of FIG. 1, to generate a phasor or other representation of motion of the conduit. A second excitation to apply to the conduit is then determined from the determined first excitation, a desired motion for the conduit, the determined motion in response to the first excitation, and a frequency response of the conduit, e.g., along the lines described above with reference to equations (28) or (78) (Block 230). The determined second excitation is then applied to the conduit (Block 240).

In particular, according to embodiments of the present invention illustrated in FIG. 3, control of a sensor conduit may be implemented as an iterative process. Operations 300 according to such a process include determining an excitation applied to a sensor conduit (Block 310). Motion of the conduit in response to the determined excitation is determined (Block 320), and a new excitation to be applied to the conduit is determined from the determined excitation, the motion in response to the determined excitation, a desired motion for the conduit and a frequency response of the conduit (Block 330). This newly determined excitation is then applied to the conduit (Block 340), and motion in response to the newly applied excitation is determined and used in determining another excitation to be applied to the conduit (Blocks 320–340). If desirable convergence conditions are present, iteration of these operations (Blocks 320–340) may cause actual motion of the conduit to approach the desired motion, as described above.

According to operations 400 of embodiments of the present invention illustrated in FIG. 4, improved performance may be achieved by adaptively generating a frequency response in conjunction with motion control operations, along lines described with reference to equation (78). A frequency response estimate (e.g., an estimated inverse frequency response $Q_k$ for a step k) is determined (Block 410). A excitation applied to the conduit is determined, along with motion of the conduit in response to the excitation (Blocks 420, 430). A new frequency response estimate (e.g., an inverse frequency response estimate $Q_{k+1}$ for a step k+1) is generated from the previously generated frequency response estimate, the determined excitation and the determined motion in response to the determined excitation (Block 440). A new excitation to be applied to the conduit is determined from the previously determined excitation, the determined motion in response to the previously determined excitation, a desired motion for the conduit, and the newly generated estimated frequency response and/or the previously generated estimated frequency response (Block 450). This excitation is then applied to the conduit (Block 460), and operations proceed in an iterative fashion (Blocks 470, 430–460) to drive motion of the conduit towards the desired motion (assuming favorable convergence conditions).

Figure 5:
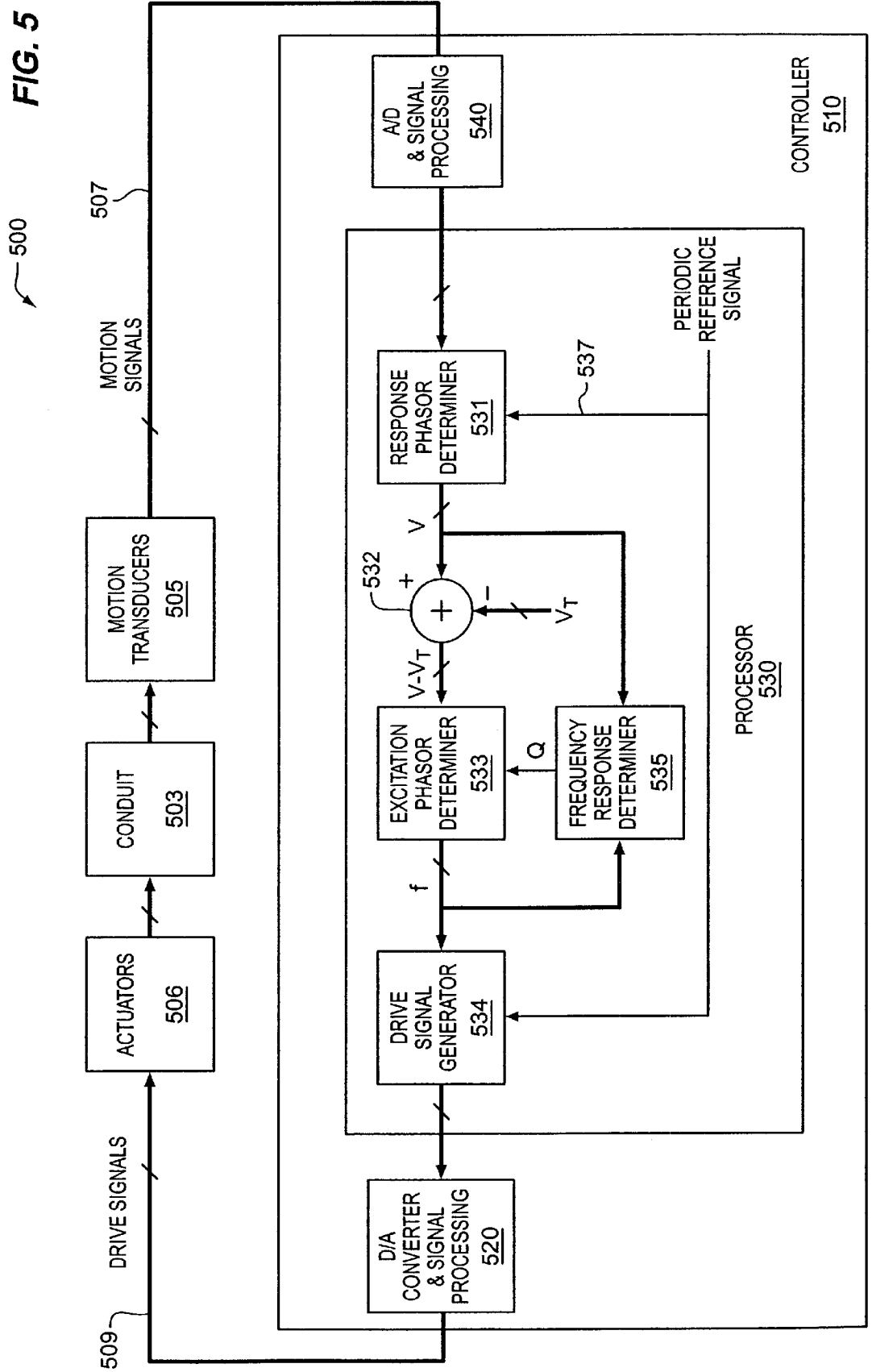
FIG. 5 is a schematic diagram illustrating a control architecture for a parameter sensor according to embodiments of the present invention.

FIG. 5 illustrates components of a parameter sensor 500 according to embodiments of the present invention. The parameter sensor 500 includes a conduit 503 configured to contain a material. Actuators 506 and motion transducers 505 are operatively associated with the conduit 503. A controller circuit 510 includes a processor 530, e.g., a microprocessor, microcontroller, digital signal processor (DSP) or other computing device along with associated storage medium, such as integrated circuit memory, magnetic memory medium, optical storage medium, or the like. Analog to digital (A/D) conversion and signal processing circuitry 540 processes motion signals 507 produced by the motion transducers 505 into an appropriate digital form for processing by the processor 530. It will be appreciated that the circuit 540 may include, for example, amplifiers, anti-aliasing filters and/or other signal processing circuits. Digital to analog (D/A) and signal processing circuitry 520 generates appropriate analog drive signals 509 for driving the actuators 506 from digital signals produced by the processor 530. It will be appreciated that the circuitry 520 may include, for example, reconstruction filters, power amplifiers, and/or other signal processing circuits.

The processor 530 implements drive control loop components, including a response phasor determiner circuit 531, a subtraction circuit 532, an excitation phasor determiner circuit 533, a frequency response determiner circuit 535 and a drive signal generator circuit 534. The response phasor determiner circuit 531 is operative to generate a response phasor vector v representing periodic motion of the conduit 505 from digital signals produced by the A/D circuitry 540 using a periodic reference signal 537, e.g., by demodulation as described below with reference to FIG. 10.

The subtraction circuit 532 subtracts a reference response phasor vector $v_T$ from the response phasor vector v to determine an error vector that is passed to the excitation phasor determiner circuit 533. The excitation phasor determiner circuit 533 generates an excitation vector f from the error vector based on a frequency response estimate Q. The frequency response determiner circuit 535 may generate the frequency response estimate in an adaptive fashion from response vectors v and excitation vectors f produced by the response phasor determiner circuit 531 and the excitation vector determiner circuit 533, respectively. The drive signal generator circuit 534 generates digital drive signals from the determined excitation f according to the reference signal 537, e.g., by modulation as described below with reference to FIG. 9.

It will be understood that the controller 510 may be implemented using a number of different types of electronic circuits. For example, as described above, many of the components of the controller 510 may be implemented in a microprocessor or other highly-integrated computing device, with components, such as the response phasor determiner 531, the excitation phasor determiner 533, and the like, being implemented in the form of one or more software (or firmware) routines, objects or other modular constructs configured to execute on the computing device. For example, these components may be implemented as program code configured to execute on a microprocessor, microcontroller, DSP or other data processing circuitry and generated using simulation and real-time signal processing design software such as the Simulink® and Real-Time Workshop® products provided by The MathWorks, Inc., Natick Mass. It will be understood, however, that functions of these components may be implemented in discrete digital hardware, or in analog circuitry that performs equivalent processing functions in an analog (continuous) domain. It will be further appreciated that functions of the processor 530 and the converter circuits 520, 540 may be integrated in one or more devices, such as in an application-specific integrated circuit (ASIC). It will be understood that, in general, the components of the controller 510 may be implemented using special purpose hardware, software or firmware executing on special or general purpose computing devices, or combinations thereof, and that the functions of the controller 510 may be integrated in a single unit, such as an electronics package configured to be positioned near the actuators 506 and transducers 505, or may be located in remotely-positioned equipment, such as in remote process control equipment.

Figure 9:
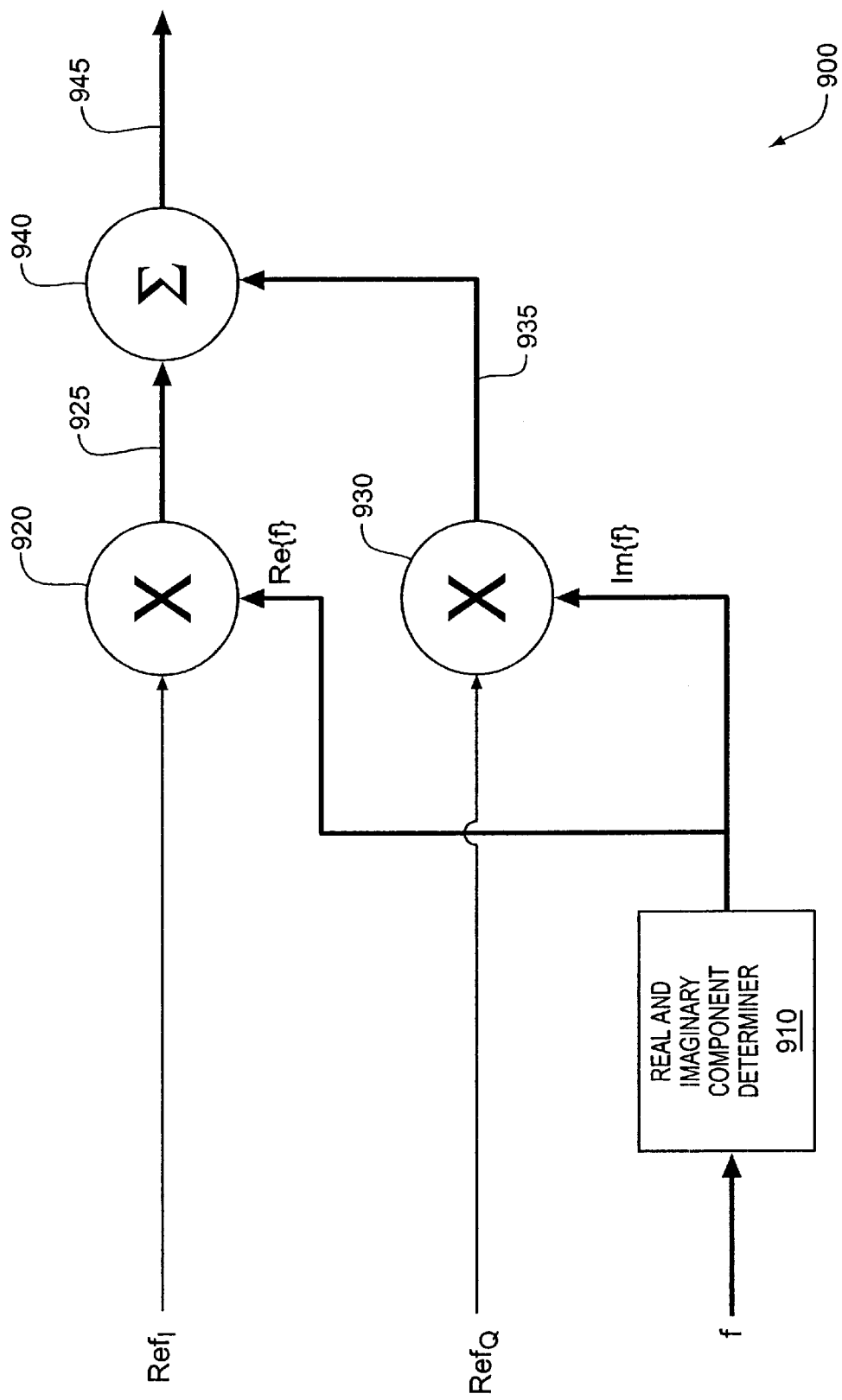
FIG. 9 is a schematic diagram illustrating an apparatus for generating excitation signals from an excitation phasor signal according to embodiments of the present invention.

FIG. 9 illustrates an exemplary implementation of a circuit 900 that generates a excitation signal 945 that may be used to drive actuators, such as the actuators 506 of FIG. 5. An excitation phasor vector signal f is applied to a real and imaginary component determiner circuit 910 that produces first and second signals Re{f}, Im{f} that represent respective real and imaginary components of the phasor vector signal f. The real and imaginary component signals Re{f}, Im{f} are applied to respective multiplier circuits 920, 930, where they multiply respective I and Q (quadrature) sinusoidal references signals $Ref_I$, $Ref_Q$. The signals 925, 935 produced by the multiplier circuits 920, 930 are summed by a summing circuit 940 to produce the excitation signal 945.

Figure 10:
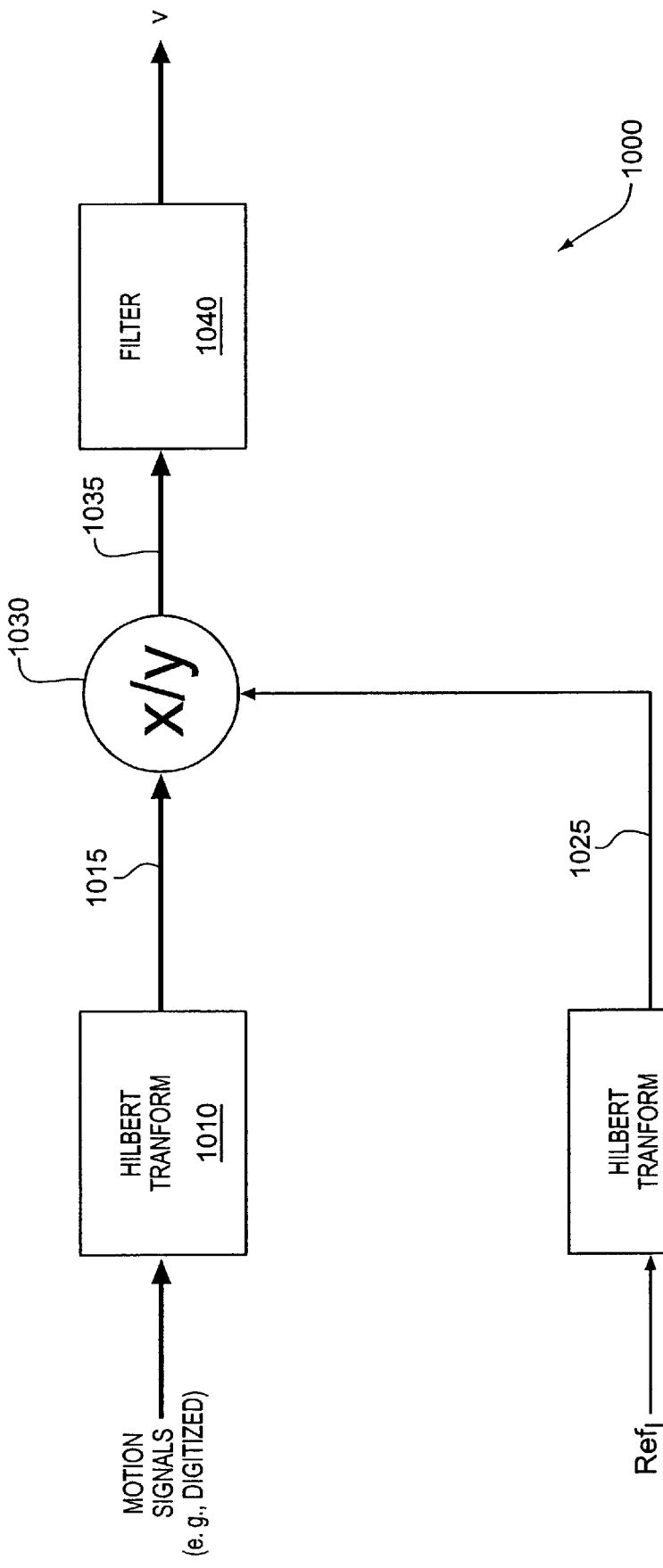
FIG. 10 is a schematic diagram illustrating an apparatus for generating a response phasor signal according embodiments of the present invention.

Referring now to FIG. 10, a circuit 1000 for generating a response phasor vector signal v includes first and second Hilbert transformer circuits 1010, 1020 that respectively process a motion signal, such as generated by the converter circuitry 540 of FIG. 5, and a sinusoidal reference signal, such as the I reference signal $Ref_I$ of FIG. 9. The signal 1015 derived from the motion signal is divided by the signal 1025 derived from the reference signal in a divider circuit 1030. The output 1035 of the divider circuit 1030 is then filtered by a low-pass filter 1040 to produce the response phasor signal v.

It will be appreciated that the circuits 900, 1000 of FIGS. 9 and 10 may be implemented in a number of different ways. For example, the various functional blocks of the circuits 900, 1000 may be constructed from standard and/or customized signal processing models in a simulation environment in the aforementioned Simulink®, which are then processed using the aforementioned Real-Time Workshop® software to produce executable code configured to perform the operations of the functions of the functional blocks of the circuits 900, 1000.

Figure 6:
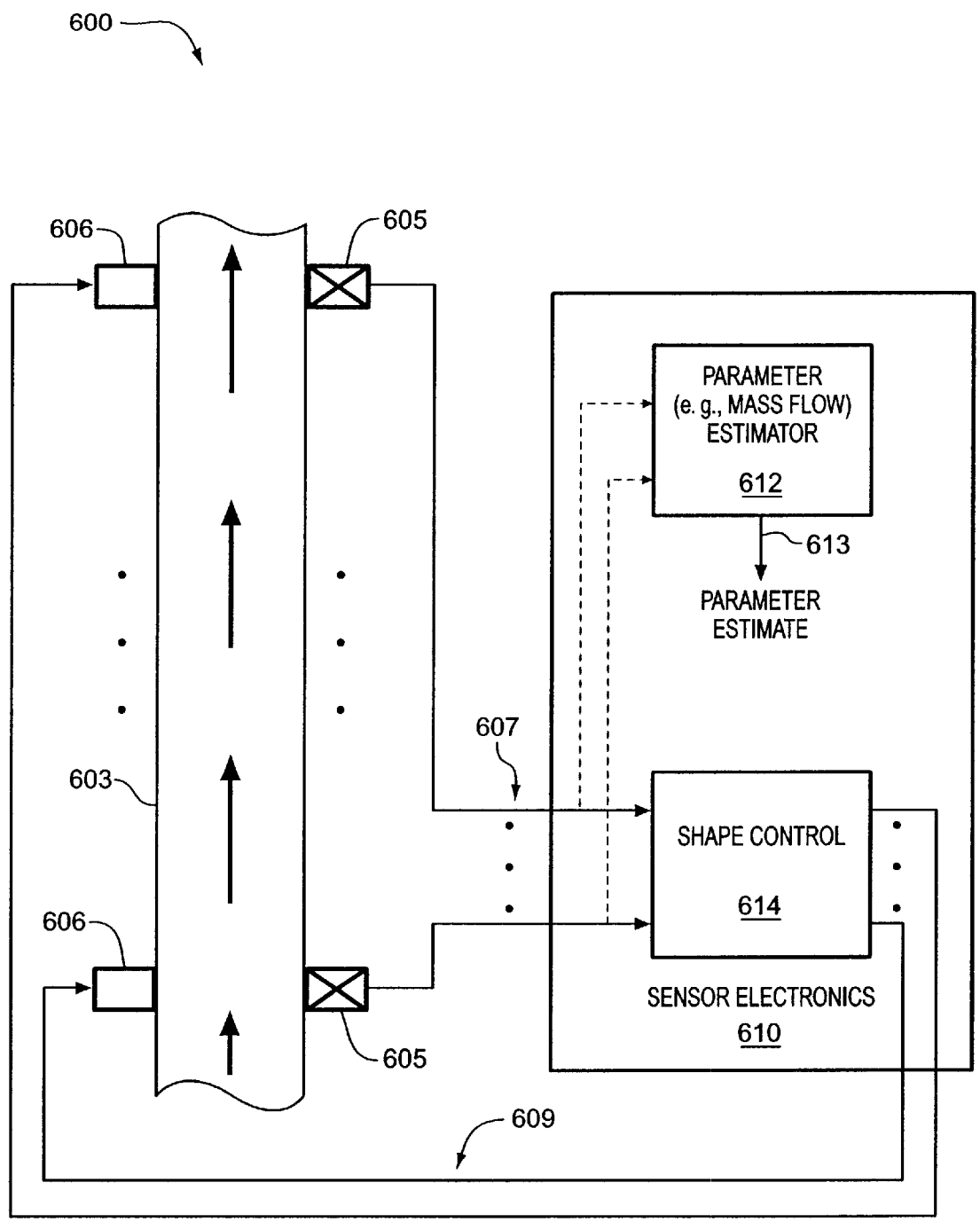
FIGS. 6 and 7 are schematic diagrams illustrating parameter sensors according to other embodiments of the present invention.

FIG. 6 illustrates a parameter sensor 600, showing how shape control can be integrated with parameter (e.g., mass flow) estimation according to embodiments of the present invention. The parameter sensor 600 includes a conduit 603 configured to contain a material, along with operatively associated actuators 606 and motion transducers 605. Motion signals 607 produced by the transducers 605 are conveyed to sensor electronics 610. The sensor electronics 610 includes a parameter estimator circuit 612 configured to receive all or some of the motion signals 607 and operative to generate an estimate of a process parameter therefrom. For example, the parameter estimator circuit 612 may include a mass flow estimator circuit that generates mass flow estimates from a time difference or phase relationship among the motion signals 607, using a conventionally-derived calibration factor or a calibration factor derived using modal estimation techniques as described in a U.S. patent application Ser. No. 09/941,462, to Normen entitled "Apparatus, Methods and Computer Program Products for Generating Mass Flow Calibration Factors Using a Normal Modal Dynamic Characterization of a Material-Containing Conduit", filed concurrently herewith and incorporated herein by reference in its entirety. The sensor electronics 610 also includes a shape control circuit 614 that is operative to generate the drive signals 609 from the motion signals 607 using shape control techniques according to the present invention, such as those described above with reference to equations (28) and (78).

It will be appreciated that the architecture of the sensor 600 of FIG. 6 is applicable to a variety of different sensor configurations. For example, the architecture of FIG. 6 is applicable to a wide variety of conduit configurations, including, but not limited to, straight-tube and curved-tube configurations. The architecture of FIG. 6 is also applicable to a variety of different arrangements of the conduit 603, actuators 606, transducers 605 and electronics 610. For example, the architecture of FIG. 6 is applicable to traditional Coriolis mass flowmeter configurations in which the conduit 603, actuators 606, transducers 605 and electronics 610 are combined in an integrated unit designed to be connected in a pipeline or other material-conveying infrastructure. It will be understood, however, that the architecture of FIG. 6 also pertains to other configurations, including, for example, "clamp-on" configurations in which an existing section of pipe or other conduit is used as the sensor conduit 603, and actuators 606, transducers 605 and electronics 610 are attached or otherwise engaged with the existing pipeline to form a parameter sensor.

Figure 7:
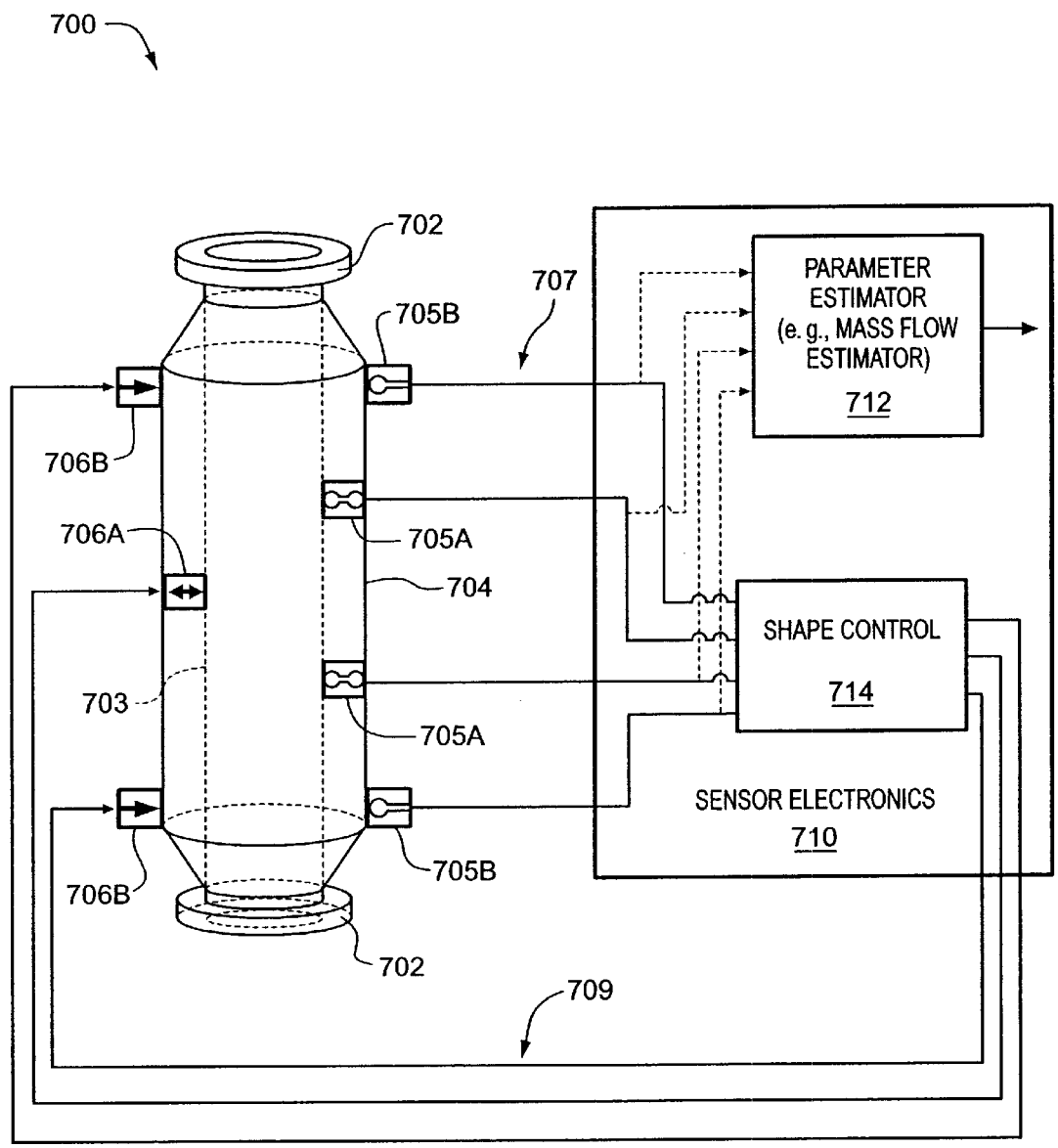

FIG. 7 illustrates an exemplary straight-tube type sensor 700 according to embodiments of the present invention. The sensor 700 includes a conduit 703 configured to contain a material. The conduit 703 is surrounded by and attached to a case 704 and is configured to attach to a piping at first and second flanges 702. A relative actuator 706A is arranged between the conduit 703 and the case 704, and is operative to induce motion of the conduit 703 relative to the case 704. A relative motion transducer 705A is operative to sense relative motion of the conduit 703 with respect to the case 704. First and second inertial actuators, such as voice-coil type inertial actuators 706B, are positioned to engage the case 704 near the flanges 702. Assuming a rigid connection of the case 704 to the conduit 703 near the flanges 702, the inertial actuators 706B may be operative to apply force to the conduit 703 near the flanges 702. First and second inertial motion transducers 705B are operative to measure motion of the case 704 and, thus, the conduit 703, near the flanges 702.

The motion transducers 705A, 705B produce motion signals 707 that are conveyed to sensor electronics 710. All or some of the motion signals 707, such as the motion signals generated by the relative motion transducers 705A, are received by a parameter estimator circuit 712, for example, a mass flow estimator circuit, that processes the received motion signals to generate an estimate of a process parameter, such as mass flow rate.

All or some of the motion signals 707 may be received by a shape control circuit 714, which processes the received motion signals to generate drive signals 709 for the actuators 706A, 706B. For example, the shape control circuit 714 may be operative to drive the conduit 703 such that the conduit 703 vibrates at a predetermined frequency in a first bending mode, with motion near the flanges 702 constrained to near zero velocity. Such constrained motion may be used to minimize bias effects that can reduce the accuracy of parameter estimates generated by the parameter estimator circuit 712. For example, as described in the aforementioned patent application Ser. No. 09/941,462 entitled "Apparatus, Methods and Computer Program Products for Generating Mass Flow Calibration Factors Using a Normal Modal Dynamic Characterization of a Material-Containing Conduit," such constrained motion may be particularly desirable for parameter sensors that use calibration factors that are predicated upon an assumed boundary condition for a normal mode.

Figure 8:
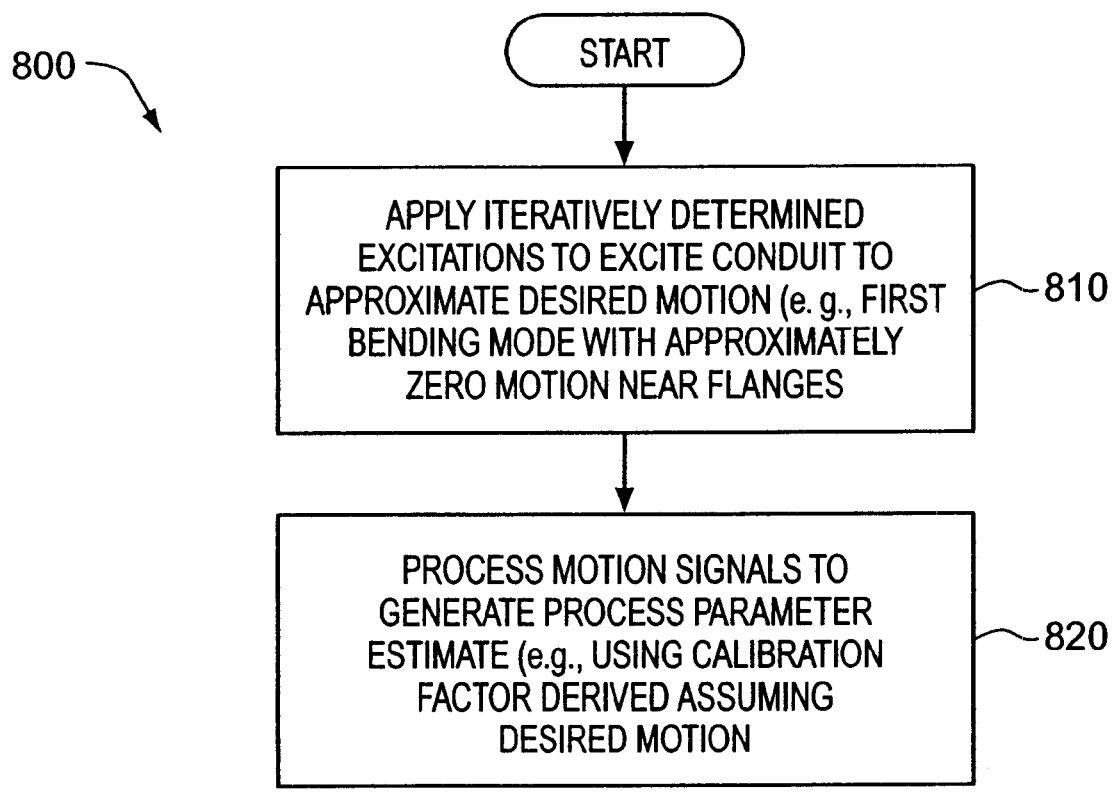
FIG. 8 is a flowchart illustrating exemplary parameter sensor operations according to still other embodiments of the present invention.

FIG. 8 illustrates exemplary parameter sensor operations 800 according to embodiments of the present invention. A sensor conduit is excited by iteratively determining and applying a series of excitations to the conduit and determining motion in response to the excitations, where each excitation is determined from a previously applied excitation, a response to the previously applied excitation (e.g., a response set point phasor vector), and a frequency response of the conduit system (Block 810). The frequency response may be assumed constant, e.g., as described above with reference to equation (28), or may be adaptively determined, e.g., as described above with reference to equation (78). Motion signals representative of motion of the excited conduit are processed to generate a process parameter estimate, for example, a mass flow rate estimate (Block 820). As discussed above with reference to FIG. 7, the parameter estimate may be generated using a number of different techniques, including those techniques that achieve improved accuracy when the excitation constrains periodic motion of the conduit to a predetermined pattern, e.g., a predetermined boundary condition for a real normal mode of the conduit, such as a first bending mode.

Behavioral simulations for a straight-tube sensor like the sensor 700 of FIG. 7 were performed with and without adaptive updating of a frequency response model. In particular, convergence of these procedures was studied for sets of flow and mounting conditions which span an envelope of a typical operating range for a mass flowmeter, as summarized in Table 1. For Table 1, the initial guess for the excitation vector was $f_k=[0, 0, 0]^T$ at step k=0, while the response set point was $v_T=[1, 0, 0]^T$, meaning the sensor tube is driven at 1.0 inches/second and that the left and right flange motions are driven to zero. Full convergence was defined as the step k when $L(f_k)/L(f_0) \leq 0.001$. The number of iteration steps required to get to this reduction in L is recorded in Table 1.

TABLE 1

| | Differential Temperature (° F.) | Fluid Density (SG) | Clamp from flange (inches) | # Steps to converge without model adaptation | # Steps to converge with model adaptation |
|---|---|---|---|---|---|
| 1 | −100 | 0.8 | 24 | 3 | 7 |
| 2 | 0 | 0.8 | 24 | 2 | 7 |
| 3 | 200 | 0.8 | 24 | 5 | 6 |
| 4 | −100 | 1.0 | 24 | 3 | 7 |
| 5 | 0 | 1.0 | 24 | 1 | 7 |
| 6 | 200 | 1.0 | 24 | 4 | 6 |
| 7 | −100 | 1.2 | 24 | 3 | 7 |
| 8 | 0 | 1.2 | 24 | 2 | 7 |
| 9 | 200 | 1.2 | 24 | 4 | 6 |
| 10 | −100 | 0.8 | 13.3 | 3 | 10 |
| 11 | 0 | 0.8 | 13.3 | 2 | 9 |
| 12 | 200 | 0.8 | 13.3 | 7 | 8 |
| 13 | −100 | 1.0 | 13.3 | 3 | 10 |
| 14 | 0 | 1.0 | 13.3 | 2 | 9 |
| 15 | 200 | 1.0 | 13.3 | 30 | 8 |
| 16 | −100 | 1.2 | 13.3 | 3 | 10 |
| 17 | 0 | 1.2 | 13.3 | 2 | 9 |
| 18 | 200 | 1.2 | 13.3 | 10 | 8 |
| 19 | −100 | 0.8 | 10.4 | 11 | 8 |
| 20 | 0 | 0.8 | 10.4 | 7 | 8 |
| 21 | 200 | 0.8 | 10.4 | ∞ | 7 |
| 22 | −100 | 1.0 | 10.4 | 10 | 8 |
| 23 | 0 | 1.0 | 10.4 | 3 | 8 |
| 24 | 200 | 1.0 | 10.4 | ∞ | 7 |
| 25 | −100 | 1.2 | 10.4 | 8 | 8 |
| 26 | 0 | 1.2 | 10.4 | ∞ | 8 |
| 27 | 200 | 1.2 | 10.4 | ∞ | 8 |

The fifth column of Table 1 indicates the number of steps for the response phasor to converge to the set point without adaptive estimation of the frequency response, as described by equation (28) above. The sixth column of Table 1 indicates the number of steps for the response phasor to converge to the set point using the procedure of equation (78) above. From Table 1, it appears that convergence is slower with adaptive estimation of the frequency response. However, convergence under "worst case" conditions of temperature appears better with on-line model adaptation than without it.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of controlling a parameter sensor comprising a conduit configured to contain a material, the method comprising:
    determining a first excitation applied to the conduit:
    determining motion of the conduit in response to the first excitation;
    adaptively determining a frequency response for the conduit by:
        generating a first estimated frequency response, and
        generating a second estimated frequency response from the first estimated frequency response, the determined first excitation, and the determined motion in response to the first excitation;
    determining a second excitation to apply to the conduit from the determined first excitation, the determined motion in response to the first excitation, a desired motion for the conduit, and at least one of the first estimated frequency response and the second estimated frequency response; and
    applying the second excitation to the conduit.

2. A method according to claim 1:
    wherein the desired motion comprises a desired periodic motion at a predetermined frequency;
    wherein determining the first excitation comprises determining a first periodic excitation at the predetermined frequency;
    wherein determining motion of the conduit in response to the first excitation comprises determining periodic motion at the predetermined frequency in response to the first periodic excitation;
    wherein determining a second excitation comprises determining a second periodic excitation at the predetermined frequency to apply to the conduit from the determined first periodic excitation, the determined periodic motion at the predetermined frequency in response to the first periodic excitation, and the desired periodic motion; and
    wherein applying the second excitation comprises applying the second periodic excitation to the conduit.

3. A method according to claim 1, wherein adaptively determining a frequency response comprises assuming a time-invariant frequency response.

4. A method according to claim 1:
    wherein generating a first estimated frequency response comprises generating a first estimated inverse frequency response;
    wherein generating a second estimated frequency response comprises generating a second estimated inverse frequency response; and
    wherein determining the second excitation from the determined first excitation, the desired motion, the determined motion in response to the first excitation, and at least one of the first estimated frequency response and the second estimated frequency response comprises determining the second excitation from the determined first excitation, the desired motion, the determined motion in response to the first excitation, and at least one of the first estimated inverse frequency response and the second estimated inverse frequency response.

5. A method according to claim 1, wherein adaptively determining the frequency response comprises determining the frequency response according to a recursive least squares estimation procedure.

6. A method according to claim 5, wherein determining the frequency response according to a recursive least squares estimation procedure comprises determining the frequency response according to a weighted recursive least squares estimation procedure.

7. A method according to claim 1, wherein generating a second estimated frequency response comprises generating the second estimated frequency response from the first frequency response according to a recursive least squares estimation process.

8. A method according to claim 7, wherein generating the second estimated frequency response from the first estimated frequency response according to a recursive least squares estimation process comprises generating the second estimated frequency response from the first estimated frequency response according to a weighted recursive least squares estimation process.

9. A method according to claim 1:
wherein determining a second excitation comprises generating a plurality of drive signals based on the determined first excitation, the determined motion in response to the first excitation, and the desired motion for the conduit; and
wherein applying the second excitation comprises applying the plurality of drive signals to a plurality of actuators operatively associated with the conduit to generate the second excitation.

10. A method according to claim 9:
wherein the desired motion comprises a desired periodic motion at a predetermined frequency;
wherein the desired motion is represented by a phasor representation of the desired periodic motion at the predetermined frequency;
wherein determining a first excitation comprises generating a phasor representation of a first periodic excitation at the predetermined frequency;
wherein determining motion of the conduit in response to the first excitation comprises processing motion signals representing the motion of the conduit in response to the first excitation to generate a phasor representation of motion of the conduit at the predetermined frequency in response to the first excitation; and
wherein generating a plurality of drive signals comprises:
generating a phasor representation of a second periodic excitation at the predetermined frequency from the phasor representation of the first periodic excitation, the phasor representation of the desired motion, the phasor representation of motion of the conduit at the predetermined frequency in response to the first excitation, and a frequency response for the conduit; and
generating the plurality of drive signals from the phasor representation of the second periodic excitation.

11. A method of determining a process parameter associated with a material contained in a conduit, the method comprising:
exciting the conduit by iteratively determining and applying new excitations to the conduit and determining motion of the conduit in response to the applied new excitations;
adaptively determining a frequency response for the conduit by:
generating a first estimated frequency response, and
generating a second estimated frequency response from the first estimated frequency response, a previous excitation to the conduit, and the determined motion of the conduit,
determining a new excitation based on a previously determined excitation, a determined motion in response to the previously determined excitation, a desired motion for the conduit, and at least one of the first estimated frequency response and the second estimated frequency response; and
processing motion signals representative of motion of the excited conduit to generate an estimate of a process parameter of a material contained in the conduit.

12. A method according to claim 11, wherein processing motion signals comprises processing the motion signals to generate a mass flow estimate.

13. A method according to claim 11, wherein exciting the conduit comprises exciting the conduit such that motion at a location of the conduit is constrained to approximate a predetermined motion.

14. A method according to claim 11, wherein exciting the conduit comprises exciting the conduit such that motion of a location of the conduit is constrained to substantially zero motion.

15. A method according to claim 11, wherein determining the frequency response comprises assuming a time-invariant frequency response.

16. A method according to claim 11:
wherein exciting the conduit comprises constraining motion of the conduit to approximate a predetermined boundary condition for a real normal mode of the conduit; and
wherein processing motion signals comprises processing the motion signals according to a procedure that assumes the predetermined boundary condition.

17. A method according to claim 16, wherein processing the motion signals according to a procedure that assumes the predetermined boundary condition comprises processing the motion signals according to a calibration factor derived from a real normal modal characterization of motion of the conduit that assumes the predetermined boundary condition.

18. A method according to claim 11, wherein exciting the conduit comprises driving the conduit in a first bending mode such that first and second spaced-apart locations of the conduit exhibit approximately zero motion.

19. A method according to claim 18, wherein exciting the conduit comprises driving a first actuator positioned at a location of the conduit between the first and second locations and second and third actuators positioned near respective ones of the first and second locations.

20. A method according to claim 11, wherein adaptively determining the frequency response comprises determining the frequency response according to a recursive least squares estimation procedure.

21. A method according to claim 20, wherein determining the frequency response according to a recursive least squares estimation procedure comprises determining the frequency response according to a weighted recursive least squares estimation procedure.

22. An apparatus for controlling a parameter sensor comprising a conduit configured to contain a material, a plurality of actuators operative to move the conduit responsive to drive signals, and a plurality of motion transducers operative to generate motion signals representative of motion of the conduit the apparatus comprising:
a shape control circuit configured to be coupled to the motion transducers and to the actuators, the shape control circuit operative to apply a first plurality of drive signals to the plurality of actuators to apply a first excitation to the conduit, and to process motion signals received from the plurality of motion transducers to determine motion of the conduit in response to the first excitation; and
a frequency response determiner circuit configured to adaptively determine a frequency response for the conduit by generating a first estimated frequency response and generating a second estimated frequency response from the first estimated frequency response, the first excitation, and the determined motion of the conduit in response to the first excitation;
wherein the shape control circuit is configured to apply a second plurality of drive signals to the plurality of actuators based on the first excitation, the determined motion in response to the first excitation, a desired motion for the conduit, and at least one of the first estimated frequency response and the second estimated frequency response to thereby apply a second excitation to the conduit.

23. An apparatus according to claim 22, wherein the shape control circuit is configured to assume a time-invariant frequency response when determining the frequency response of the conduit.

24. An apparatus according to claim 22:
wherein the first estimated frequency response comprises a first estimated inverse frequency response;
wherein the second estimated frequency response comprises a second estimated inverse frequency response; and
wherein the shape control circuit is operative to determine the second excitation from the determined first excitation, the desired motion, the determined motion in response to the first excitation, and at least one of the first estimated inverse frequency response and the second estimated inverse frequency response.

25. An apparatus according to claim 22:
wherein the desired motion comprises a desired periodic motion at a predetermined frequency;
wherein the desired motion is represented by a phasor representation of the desired periodic motion at the predetermined frequency;
wherein determining a first excitation comprises generating a phasor representation of a first periodic excitation at the predetermined frequency;
wherein determining motion of the conduit in response to the first excitation comprises processing motion signals representing the motion of the conduit in response to the first excitation to generate a phasor representation of motion of the conduit at the predetermined frequency in response to the first excitation; and
wherein generating a plurality of drive signals comprises:
generating a phasor representation of a second periodic excitation at the predetermined frequency from the phasor representation of the first periodic excitation, the phasor representation of the desired motion, the phasor representation of motion of the conduit at the predetermined frequency in response to the first excitation, and a frequency response for the conduit; and
generating the plurality of drive signals from the phasor representation of the second periodic excitation.

26. An apparatus according to claim 22, wherein the frequency response determiner circuit is operative to determine the frequency response according to a recursive least squares estimation procedure.

27. An apparatus according to claim 26, wherein the frequency response determiner circuit is operative to determine the frequency response according to a weighted recursive least squares estimation procedure.

28. An apparatus according to claim 22, wherein the frequency response determiner circuit is operative to generate the second estimated frequency response from the first frequency response according to a recursive least squares estimation process.

29. An apparatus according to claim 28, wherein the frequency response determiner circuit is operative to generate the second estimated frequency response from the first estimated frequency response according to a weighted recursive least squares estimation process.

30. A process parameter sensor, comprising:
a conduit configured to contain a material;
a plurality of actuators operatively associated with the conduit;
a plurality of motion transducers operatively associated with the conduit;
a shape control circuit configured to receive motion signals from the plurality of motion transducers and to apply drive signals to the plurality of actuators, the shape control circuit operative to excite the conduit by iteratively determining and applying new excitations to the conduit and determining motion of the conduit in response to the applied new excitations;
a frequency response determiner circuit configured to adaptively determine a frequency response for the conduit by generating a first estimated frequency response and generating a second estimated frequency response from the first estimated frequency response, a previous excitation to the conduit, and the determined motion of the conduit in response to the first excitation;
the shape control circuit configured to determine a new excitation based on a previously determined excitation, a determined motion in response to the previously determined excitation, a desired motion for the conduit, and at least one of the first estimated frequency response and the second estimated frequency response; and
a process parameter estimator circuit configured to receive motion signals from the plurality of motion transducers and operative to process the received motion signals to generate an estimate of a process parameter associated with a material contained in the conduit.

31. A sensor according to claim 30, wherein the process parameter estimator circuit comprises a mass flow estimator circuit.

32. A sensor according to claim 30, wherein the shape control circuit is operative to excite the conduit such that motion at a location of the conduit is constrained to approximate a predetermined motion.

33. A sensor according to claim 30, wherein the shape control circuit is operative to excite the conduit such that motion of a location of the conduit is constrained to substantially zero motion.

34. A sensor according to claim 30:
wherein the shape control circuit is operative to constrain motion of the conduit to approximate a predetermined boundary condition for a real normal mode of the conduit; and
wherein the process parameter estimator circuit is operative to process the received motion signals according to a procedure that assumes the predetermined boundary condition.

35. A sensor according to claim 34, wherein the process parameter estimator circuit is operative to process the motion signals according to a calibration factor derived from a real normal modal characterization of motion of the conduit that assumes the predetermined boundary condition.

36. A sensor according to claim 30, wherein the conduit comprises a substantially straight tube, and wherein the shape control circuit is operative to drive the tube in a first bending mode such that first and second spaced-apart locations of the tube exhibit approximately zero motion.

37. A sensor according to claim 36, wherein the shape control circuit is operative to drive a first actuator positioned at a location of the tube between the first and second locations and second and third actuators positioned near respective ones of the first and second locations.

38. A sensor according to claim 30, wherein the frequency response determiner circuit is operative to determine the frequency response according to a recursive least squares estimation procedure.

39. A sensor according to claim 38, wherein the frequency response determiner circuit is operative to determine the frequency response according to a weighted recursive least squares estimation procedure.

40. An apparatus for controlling a parameter sensor comprising a conduit configured to contain a material, a plurality of actuators operatively associated with the conduit and a plurality of motion transducers operatively associated with the conduit, the apparatus comprising:

means, responsive to the motion transducers, for determining motion of the conduit in response to a known first excitation applied to the conduit;

means for adaptively determining a frequency response for the conduit, comprising:

means for generating a first estimated frequency response, and means for generating a second estimated frequency response from the first estimated frequency response, the known first excitation, and the determined motion of the conduit in response to the first excitation; means, responsive to the means for determining motion, for determining a second excitation to apply to the conduit from the known first excitation, the determined motion in response to the first excitation, a desired motion for the conduit, and at least one of the first estimated frequency response and the second estimated frequency response; and means, responsive to the means for determining a second excitation and operatively associated with the plurality of actuators, for causing the actuators to apply the second excitation to the conduit.

41. An apparatus according to claim 40:

wherein the desired motion comprises a desired periodic motion at a predetermined frequency;

wherein the known first excitation comprises a known first periodic excitation at the predetermined frequency;

wherein the means for determining motion of the conduit in response to the first excitation comprises means for determining periodic motion at the predetermined frequency in response to the first periodic excitation;

wherein the means for determining a second excitation comprises means for determining a second periodic excitation at the predetermined frequency to apply to the conduit from the known first periodic excitation, the determined periodic motion at the predetermined frequency in response to the first periodic excitation, and the desired periodic motion; and wherein the means for causing the plurality of actuators to apply the second excitation comprises means for causing the plurality of actuators to apply the second periodic excitation to the conduit.

42. An apparatus according to claim 40:

wherein the means for generating a first estimated frequency response comprises means for generating a first estimated inverse frequency response:

wherein the means for generating a second estimated frequency response comprises means for generating a second estimated inverse frequency response; and wherein the means for determining the second excitation from the known first excitation, the desired motion, the determined motion in response to the first excitation, and at least one of the first estimated frequency response and the second estimated frequency response comprises means for determining the second excitation from the known first excitation, the desired motion, the determined motion in response to the first excitation, and at least one of the first estimated inverse frequency response and the second estimated inverse frequency response.

43. A method according to claim 40, wherein the means for adaptively determining the frequency response comprises means for determining the frequency response according to a recursive least squares estimation procedure.

44. A method according to claim 43, wherein the means for determining the frequency response according to a recursive least squares estimation procedure comprises means for determining the frequency response according to a weighted recursive least squares estimation procedure.

45. An apparatus according to claim 40, wherein the means for generating a second estimated frequency response comprises means for generating the second estimated frequency response from the first frequency response according to a recursive least squares estimation process.

46. An apparatus according to claim 45, wherein the means for generating the second estimated frequency response from the first estimated frequency response according to a recursive least squares estimation process comprises means for generating the second estimated frequency response from the first estimated frequency response according to a weighted recursive least squares estimation process.

47. An apparatus according to claim 40:

wherein the means for determining a second excitation comprises means fir generating a plurality of drive signals based on the known first excitation, the determined motion in response to the first excitation, and the desired motion for the conduit; and wherein the means for causing the plurality of actuators to apply the second excitation comprises means for applying the plurality of drive signals to the plurality of actuators to generate the second excitation.

48. An apparatus according to claim 47:

wherein the desired motion comprises a desired periodic motion at a predetermined frequency;

wherein the desired motion is represented by a phasor representation of the desired periodic motion at the predetermined frequency;

wherein the known first excitation is represented by a phasor representation of a first periodic excitation at the predetermined frequency;

wherein the means for determining motion of the conduit in response to the first excitation comprises means for processing motion signals generated by the plurality of motion transducers to generate a phasor representation of motion of the conduit at the predetermined frequency in response to the first excitation; and wherein the means for applying a plurality of drive signals comprises:

means for generating a phasor representation of a second periodic excitation at the predetermined frequency from the phasor representation of the first periodic excitation, the phasor representation of the desired motion, the phasor representation of motion of the conduit at the predetermined frequency in response to the first excitation, and a frequency response for the conduit; and means for generating the plurality of drive signals from the phasor representation of the second periodic excitation.

49. A computer program product for controlling a parameter sensor comprising a conduit configured to contain a material, a plurality of actuators operatively associated with the conduit, and a plurality of motion transducers operatively associated with the conduit the computer program product comprising:

computer-readable program code embodied in a computer readable storage medium, the computer-readable program code comprising:

program code, responsive to the motion transducers, for determining motion of the conduit in response to a known first excitation applied to the conduit;

program code for adaptively determining a frequency response for the conduit, comprising:

program code for generating a first estimated frequency response, and program code for generating a second estimated frequency response from the first estimated frequency response, the known first excitation, and the determined motion of the conduit in response to the first excitation;

program code, responsive to the program code for determining motion, for determining a second excitation to apply to the conduit from the known first excitation, the determined motion in response to the first excitation, a desired motion for the conduit, and at least one of the first estimated frequency response and the second estimated frequency response; and program code for causing the plurality of actuators to apply the second excitation to the conduit.

50. A computer program product according to claim 49:

wherein the desired motion comprises a desired periodic motion at a predetermined frequency;

wherein the known first excitation comprises a known first periodic excitation at the predetermined frequency;

wherein the program code for determining motion of the conduit in response to the first excitation comprises program code for determining periodic motion at the predetermined frequency in response to the first periodic excitation;

wherein the program code for determining a second excitation comprises program code for determining a second periodic excitation at the predetermined frequency to apply to the conduit from the known first periodic excitation, the determined periodic motion at the predetermined frequency in response to the first periodic excitation, and the desired periodic motion; and wherein the program code for causing the plurality of actuators to apply the second excitation comprises program code for causing the plurality of actuators to apply the second periodic excitation to the conduit.

51. A computer program product according to claim 49:

wherein the program code for generating a first estimated frequency response comprises program code for generating a first estimated inverse frequency response;

wherein the program code for generating a second estimated frequency response comprises program code for generating a second estimated inverse frequency response; and wherein the program code for determining the second excitation from the known first excitation, the desired motion, the determined motion in response to the first excitation, and at least one of the first estimated frequency response and the second estimated frequency response comprises program code for determining the second excitation from the known first excitation, the desired motion, the determined motion in response to the first excitation, and at least one of the first estimated inverse frequency response and the second estimated inverse frequency response.

52. A computer program product according to claim 49:

wherein the desired motion comprises a desired periodic motion at a predetermined frequency;

wherein the desired motion is represented by a phasor representation of the desired periodic motion at the predetermined frequency;

wherein the known first excitation is represented by a phasor representation of a first periodic excitation at the predetermined frequency;

wherein the program code for determining motion of the conduit in response to the first excitation comprises program code for processing motion signals representing motion of the conduit to generate a phasor representation of motion of the conduit at the predetermined frequency in response to the first excitation; and wherein the program code for causing the plurality of actuators to apply the second excitation comprises program code for generating a phasor representation of a second periodic excitation at the predetermined frequency from the phasor representation of the first periodic excitation, the phasor representation of the desired motion, the phasor representation of motion of the conduit at the predetermined frequency in response to the first excitation, and a frequency response for the conduit.

53. A computer program product according to claim 49, wherein the program code for adaptively determining the frequency response comprises program code for determining the frequency response according to a recursive least squares estimation procedure.

54. A computer program product according to claim 53, wherein the program code for determining the frequency response according to a recursive least squares estimation procedure comprises program code for determining the frequency response according to a weighted recursive least squares estimation procedure.

55. A computer program product according to claim 49, wherein the program code for generating a second estimated frequency response comprises program code for generating the second estimated frequency response from the first frequency response according to a recursive least squares estimation process.

56. A computer program product according to claim 55, wherein the program code for generating the second estimated frequency response from the first estimated frequency response according to a recursive least squares estimation process comprises program code for generating the second estimated frequency response from the first estimated frequency response according to a weighted recursive least squares estimation process.

* * * * *

UNITED STATES PATENT AND TRADEMARK OFFICE
CERTIFICATE OF CORRECTION

PATENT NO.     : 6,606,573 B2
DATED          : August 12, 2003
INVENTOR(S)    : Matthew Glen Wheeler It is certified that error appears in the above-identified patent and that said Letters Patent is hereby corrected as shown below:

Column 3,
Line 67, replace "signals-from the plurality of motion transducers and to apply"
with -- signals from the plurality of motion transducers and to apply --

Column 10,
Line 55, replace "and $[v_{-N+1},...,v_{k-1},v_k, v_{k+1}]$ are measured exicitation and"
with -- and $[[v_{k-N+1},...,v_{k-1},v_k, v_{k+1}]$ are measured excitation and --

Column 11,
Line 10, replace "The squared error is smallest when the gradient $\nabla_q$, of $e_i e_i^H$"
with -- The squared error is smallest when the gradient $\nabla_{qi}$, of $e_i e_i^H$ --
Line 13, replace "$\nabla_q (e_i e_i^H) = qiVV^H - f_i V^H = 0$     (40)"
with -- $\nabla_{qi} (e_i e_i^H) = q_i VV^H - f_i V^H = 0$     (40) --

Signed and Sealed this

Twenty-ninth Day of June, 2004

JON W. DUDAS
*Acting Director of the United States Patent and Trademark Office*